US011150754B2

(12) United States Patent
Lee et al.

(10) Patent No.: US 11,150,754 B2
(45) Date of Patent: Oct. 19, 2021

(54) DISPLAY DEVICE

(71) Applicant: Samsung Display Co., Ltd., Yongin-Si (KR)

(72) Inventors: Ah-ram Lee, Cheonan-si (KR); Seongsik Ahn, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/402,136

(22) Filed: May 2, 2019

(65) Prior Publication Data
US 2019/0377447 A1    Dec. 12, 2019

(30) Foreign Application Priority Data
Jun. 8, 2018  (KR) .................. 10-2018-0066324

(51) Int. Cl.
G06F 3/041  (2006.01)
G06F 1/16   (2006.01)
G06F 3/0488 (2013.01)

(52) U.S. Cl.
CPC .......... *G06F 3/0412* (2013.01); *G06F 1/1643* (2013.01); *G06F 3/04883* (2013.01)

(58) Field of Classification Search
CPC .. G06F 3/04164; G06F 3/0416; G06F 3/0412; G06F 1/1652
See application file for complete search history.

(56) References Cited

U.S. PATENT DOCUMENTS

| 10,083,636 B2 | 9/2018 | Han |
| 2011/0012845 A1* | 1/2011 | Rothkopf ............... G06F 3/044 345/173 |
| 2012/0176325 A1 | 7/2012 | Okazaki et al. |

(Continued)

FOREIGN PATENT DOCUMENTS

| JP | 2012-145779 | 8/2012 |
| KR | 10-2017-0040439 | 4/2017 |

(Continued)

OTHER PUBLICATIONS

Extended European Search Report dated Sep. 6, 2019, in European Patent Application No. 19176346.5.

(Continued)

*Primary Examiner* — Priyank J Shah
(74) *Attorney, Agent, or Firm* — H.C. Park & Associates, PLC

(57) ABSTRACT

A display device includes a window member, a display panel, a first adhesive member, and a reinforcing member. The display panel is disposed below the window member. The first adhesive member is disposed between the window member and the display panel. The first adhesive member overlaps the display panel. The reinforcing member is disposed below the display panel such that the display panel is disposed between the window member and the reinforcing member. On a plane of the window member, a first minimum distance from an outermost portion of the window member to an outermost portion of the display panel is equal to a second minimum distance from the outermost portion of the window member to an outermost portion of the first adhesive member.

20 Claims, 19 Drawing Sheets

(56) References Cited

U.S. PATENT DOCUMENTS

| | | | |
|---|---|---|---|
| 2014/0307396 A1* | 10/2014 | Lee | G02F 1/133305 |
| | | | 361/749 |
| 2015/0313004 A1 | 10/2015 | Namkung et al. | |
| 2016/0093685 A1* | 3/2016 | Kwon | H01L 51/0097 |
| | | | 257/40 |
| 2016/0239132 A1 | 8/2016 | Lee | |
| 2016/0275830 A1* | 9/2016 | You | G06F 3/041 |
| 2016/0306488 A1* | 10/2016 | Kim | G06F 1/1626 |
| 2017/0047547 A1* | 2/2017 | Son | H01L 51/5253 |
| 2017/0099741 A1 | 4/2017 | Shin | |
| 2017/0293194 A1 | 10/2017 | Hou et al. | |
| 2018/0004053 A1 | 1/2018 | Kawata | |
| 2018/0103553 A1 | 4/2018 | Kim et al. | |
| 2018/0371196 A1 | 12/2018 | Park et al. | |
| 2019/0165049 A1* | 5/2019 | Kim | H01L 27/323 |
| 2019/0269011 A1 | 8/2019 | Lee et al. | |

FOREIGN PATENT DOCUMENTS

| | | |
|---|---|---|
| KR | 10-2017-0068823 | 6/2017 |
| KR | 10-2018-0021299 | 3/2018 |
| KR | 10-2019-0102123 | 9/2019 |

OTHER PUBLICATIONS

Examination Report dated Jul. 6, 2020, in European Patent Application No. 19176346.5.

* cited by examiner

DISPLAY DEVICE

CROSS-REFERENCE TO RELATED APPLICATION

This application claims priority from and the benefit of Korean Patent Application No. 10-2018-0066324, filed Jun. 8, 2018, which is hereby incorporated by reference for all purposes as if fully set forth herein.

BACKGROUND

Field

Exemplary embodiments generally relate to a display device, and more particularly, to a display device including a reinforcing member supporting a display panel.

Discussion

Various display devices that are used for multimedia devices, such as a television, a mobile phone, a tablet computer, a navigation unit, and a game console, have been developed. The display device may include a display module for displaying an image and detecting an external input, and a reinforcing member disposed below the display module. It is also noted that the display device may display an image through an active area having various shapes and areas and detect the external input. The reinforcing member may be fixed to a bottom portion of the display module through an adhesive member. An external force may be applied to the reinforcing member so as to attach the adhesive member disposed on the reinforcing member to the bottom portion of the display module.

The above information disclosed in this section is only for understanding the background of the inventive concepts, and, therefore, may contain information that does not form prior art.

SUMMARY

Some exemplary embodiments provide a display device capable of reducing a defect that may be generated in a process of attaching a display panel and a reinforcing member to each other.

Additional aspects will be set forth in the detailed description which follows, and, in part, will be apparent from the disclosure, or may be learned by practice of the inventive concepts.

According to some exemplary embodiments, a display device includes a window member, a display panel, a first adhesive member, and a reinforcing member. The display panel is disposed below the window member. The first adhesive member is disposed between the window member and the display panel. The first adhesive member overlaps the display panel. The reinforcing member is disposed below the display panel such that the display panel is disposed between the window member and the reinforcing member. On a plane of the window member, a first minimum distance from an outermost portion of the window member to an outermost portion of the display panel is equal to a second minimum distance from the outermost portion of the window member to an outermost portion of the first adhesive member.

In some exemplary embodiments, on the plane of the window member, the first minimum distance may be less than a minimum distance from the outermost portion of the window member to an outermost portion of the reinforcing member.

In some exemplary embodiments, the display panel may include a first non-bending area disposed above the reinforcing member and entirely overlapping the first adhesive member, a second non-bending area disposed below the reinforcing member, and a bending area connecting the first non-bending area to the second non-bending area.

In some exemplary embodiments, on the plane of the window member, the first minimum distance may be a distance from the outermost portion of the window member to an outermost portion of the first non-bending area.

In some exemplary embodiments, an entire area of the first adhesive member may entirely overlap the first non-bending area and may partially overlap the second non-bending area.

In some exemplary embodiments, a plurality of display elements may be disposed on the first non-bending area.

In some exemplary embodiments, the display device may further include a protection member disposed between the display panel and the reinforcing member. The protection member may include a first protection member disposed on the first non-bending area, and a second protection member disposed on the second non-bending area. An entire area of the reinforcing member may entirely overlap the first protection member.

In some exemplary embodiments, the display device may further include an input sensing unit disposed between the window member and the display panel, and a second adhesive member disposed between the window member and the input sensing unit. The first adhesive member may be disposed between the input sensing unit and the display panel.

In some exemplary embodiments, on the plane of the window member, a minimum distance from the outermost portion of the window member to an outermost portion of the reinforcing member may be equal to or greater than the first minimum distance.

In some exemplary embodiments, the reinforcing member may include a metallic material.

According to some exemplary embodiments, a display device includes a window member, a display panel, a first adhesive member, and a reinforcing member. The display panel is disposed below the window member. The first adhesive member is disposed between the window member and the display panel. The reinforcing member is disposed below the display panel such that the display panel is disposed between the window member and the reinforcing member. On a plane of the window member, a first minimum distance from an outermost portion of the window member to an outermost portion of the display panel is equal to or greater than a second minimum distance from the outermost portion of the window member to an outermost portion of the reinforcing member.

In some exemplary embodiments, on the plane of the window member, the first minimum distance may be less than a minimum distance from the outermost portion of the window member to an outermost portion of the first adhesive member.

In some exemplary embodiments, the display panel may include a first non-bending area disposed above the reinforcing member and entirely overlapping the reinforcing member, a second non-bending area disposed below the reinforcing member and partially overlapping the reinforcing member, and a bending area connecting the first non-bending area to the second non-bending area.

In some exemplary embodiments, on the plane of the window member, the reinforcing member may have an area greater than that of the first non-bending area.

In some exemplary embodiments, the display device may further include a first protection member disposed between the first non-bending area and the reinforcing member, and a second protection member disposed on the second non-bending area.

According to some exemplary embodiments, a display device includes a window member, a display panel, an adhesive member, a protection member, and a reinforcing member. The display panel is disposed below the window member. The adhesive member is disposed between the window member and the display panel. The protection member is disposed below the display panel such that the display panel is disposed between the window member and the protection member. The protection member includes a top surface, a bottom surface, and a side surface connecting the top surface to the bottom surface. The reinforcing member is disposed on the bottom surface of the protection member. The bottom surface of the protection member includes an edge area recessed toward the top surface of the protection member. The protection member includes a main area surrounded by the edge area. An outermost portion of the reinforcing member overlaps the edge area.

In some exemplary embodiments, in a thickness direction of the window member, a thickness of the edge area may be smaller than a thickness of the main area.

In some exemplary embodiments, the display panel may include a first non-bending area disposed on the top surface of the protection member, a second non-bending area disposed below the reinforcing member, and a bending area connecting the first non-bending area to the second non-bending area.

In some exemplary embodiments, the protection member may include a first protection member disposed on the first non-bending area and a second protection member disposed on the second non-bending area. A thickness of the second protection member may be equal to a thickness of the main area of the first protection member.

In some exemplary embodiments, on a plane of the window member, a minimum distance from an outermost portion of the window member to an outermost portion of the protection member may be less than a minimum distance from the outermost portion of the window member to the outermost portion of the reinforcing member.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1A:
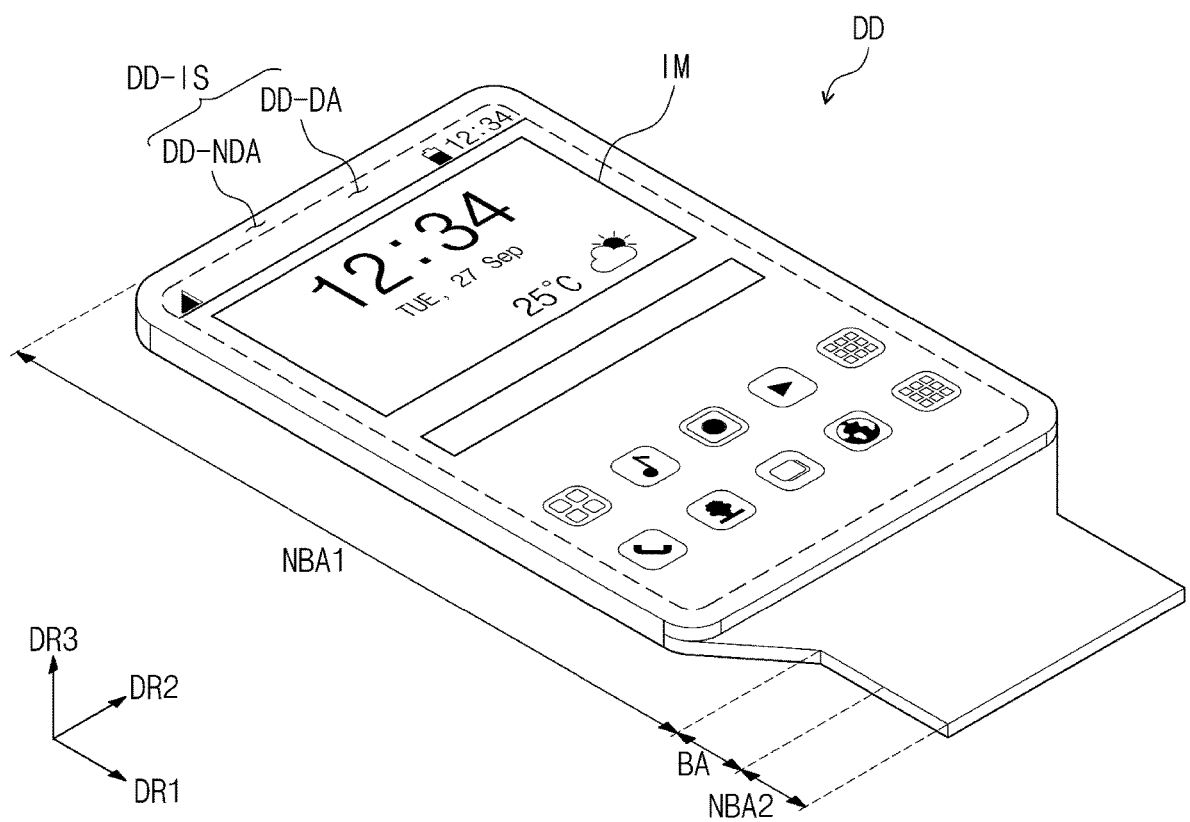
FIGS. 1A and 1B are perspective views illustrating a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to cross-sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

Figure 1B:
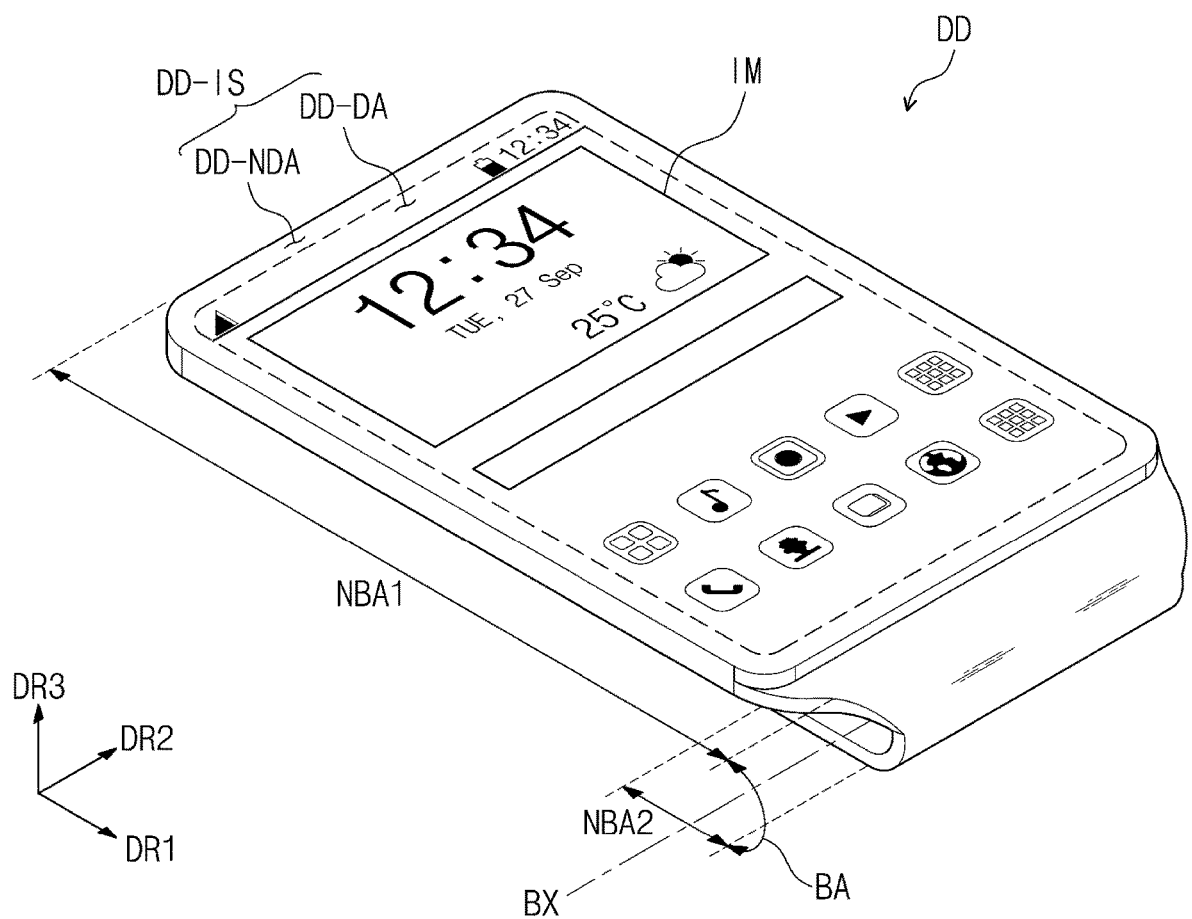

FIGS. 1A and 1B are perspective views illustrating a display device according to some exemplary embodiments.

Referring to FIGS. 1A and 1B, a display surface DD-IS may have a shape extending in a first direction DR1 and a second direction DR2 crossing the first direction DR1. A normal direction of the display surface DD-IS, e.g., a thickness direction of the display device DD, is in a third direction DR3. Hereinafter, a front surface (or top surface) and a rear surface (or bottom surface) of each of members or units of a display device DD are distinguished by the third direction DR3. However, although the first to third directions DR1, DR2, and DR3 are exemplarily illustrated in the various drawings, the first to third directions DR1, DR2, and DR3 may be converted with respect to each other.

According to some exemplary embodiments, at least one portion of the display surface DD-IS may include a curve. For example, on a plane, the display surface DD-IS may include a first side extending in the first direction DR1, a second side extending in the second direction DR2, a third side extending in the first direction DR1 and facing the first side, and a fourth side extending in the second direction DR2 and facing the second side. Also, the display surface DD-IS includes a first curve connecting the first side to the second side, a second curve connecting the second side to the third side, a third curve connecting the third side to the fourth side, and a fourth curve connecting the fourth side to the first side. The first to fourth curves may correspond to corners of the display surface DD-IS.

According to some exemplary embodiments, the display surface DD-IS may be parallel to a surface defined by the first direction DR1 and the second direction DR2. In this case, the display surface DD-IS may have a rectangular shape.

Although a portion of the display device DD has a curved display surface DD-IS on a plane, exemplary embodiments are not limited thereto. For example, a portion of the display device DD may have a three-dimensional display surface. The three-dimensional display surface may include a plurality display areas in directions different from each other. For example, the three-dimensional display surface may include a polygonal cylinder shaped display surface.

The display device DD according to some exemplary embodiments may be a rigid display device; however, exemplary embodiments are not limited thereto. For example, the display device DD according to some exemplary embodiments may be a flexible display device. For illustrative convenience, the display device DD applied to (or as) a mobile phone terminal is exemplarily shown.

Although not shown, as electronic modules mounted on a main board, a camera module, and a power module are disposed on a bracket (or a case) together with the display device DD, the mobile phone terminal may be constituted. The display device DD according to some exemplary embodiments may be applied to a small and/or medium sized electronic device, such as a tablet computer, a vehicle navigation unit, a game console, and a smart watch, as well as a large sized electronic devices, such as a television and a monitor.

As illustrated in FIG. 1A, the display surface DD-IS includes a display area DD-DA on (or in) which an image IM is displayed, and a bezel area DD-NDA disposed adjacent to the display area DD-DA. The bezel area DD-NDA is an area on which the image is not displayed. In FIG. 1A, a clock window and icon images are illustrated as an example of the image IM, but exemplary embodiments are not limited thereto.

The display device DD according to some exemplary embodiments may include a first non-bending area NBA1, a second non-bending area NBA2, and a bending area BA. The first non-bending area NBA1, the second non-bending area NBA2, and the bending area BA may be set with reference to the display panel DP that will be described later with reference to FIG. 3.

On a plane, the display device DD may have widths that are different for each area in the second direction DR2. Each of the bending area BA and the second non-bending area NBA2 may have a width in the second direction DR2 that is less than a maximum width of the first non-bending area NBA1 in the second direction DR2. Since the bending area BA has a width that is relatively smaller than that of the first non-bending area NBA1, the bending area BA may be easily bent. In FIG. 1A, a boundary area (of which a width gradually decreasing in the second direction DR2) may be included in the first non-bending area NBA1. In some exemplary embodiments, the boundary area (of which a width gradually decreasing in the second direction DR2) may be omitted. The second non-bending area NBA2 may include a pad area SPD (refer to FIG. 4B).

FIG. 1B illustrates a state in which the display device DD is bent. The bending area BA is bent along a bending axis BX extending in the second direction DR2. In a state in which the display device DD is bent, the second non-bending area NBA2 faces the first non-bending area NBA1 while being spaced apart from the first non-bending area NBA1 in the third direction DR3.

Figure 1C:
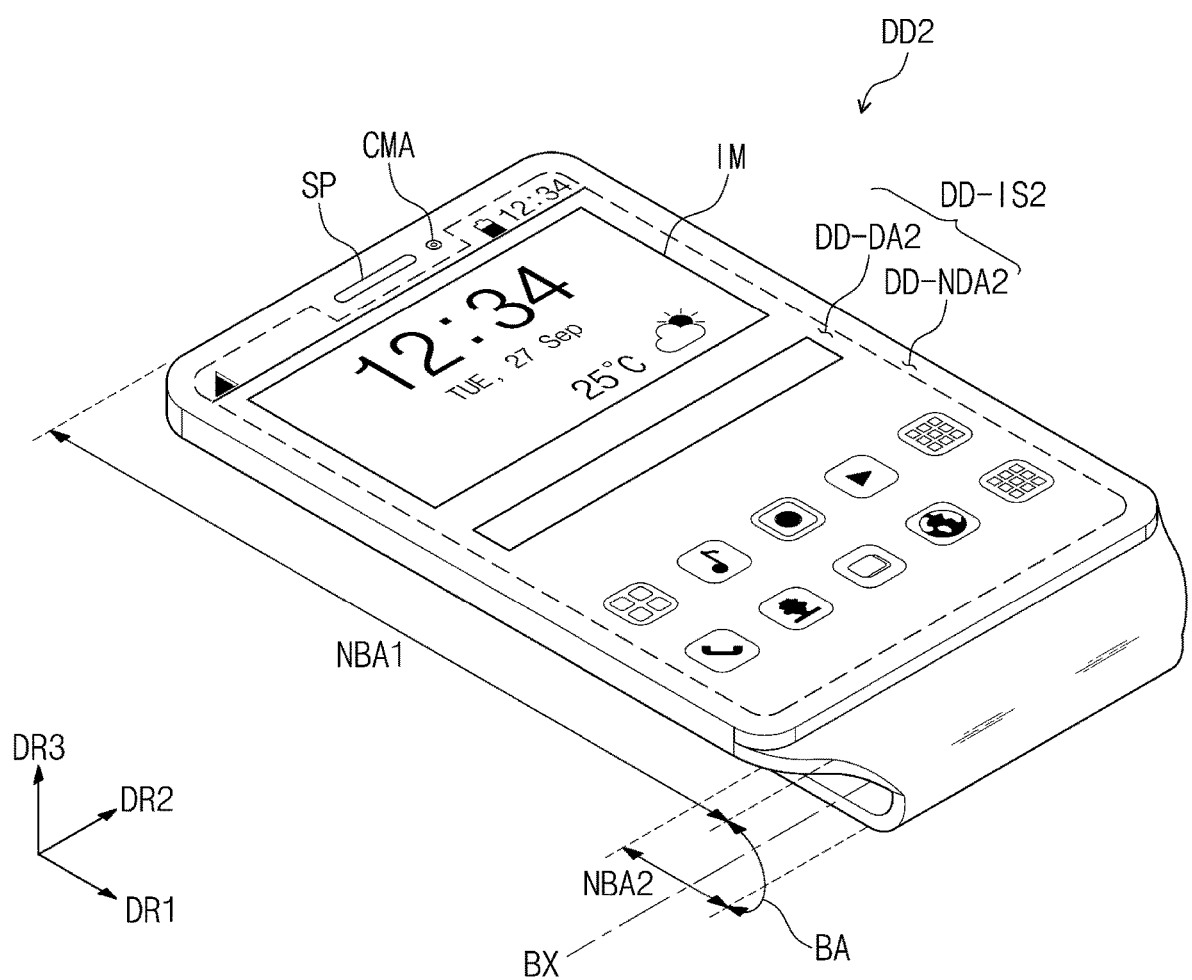
FIG. 1C is a perspective view illustrating a display device according to some exemplary embodiments.
Figure 1D:
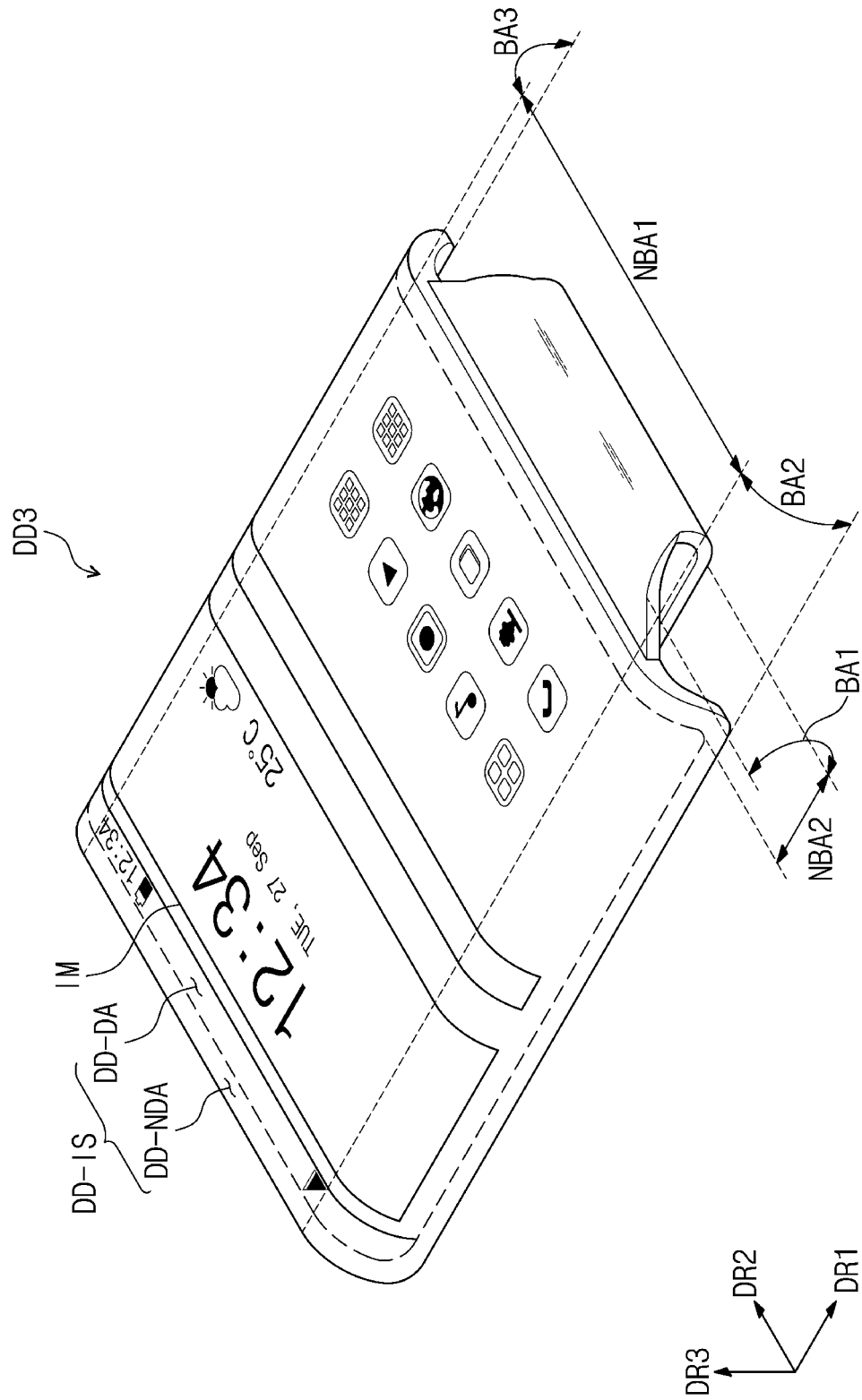
FIG. 1D is a perspective view illustrating a display device according to some exemplary embodiments.
Figure 1E:
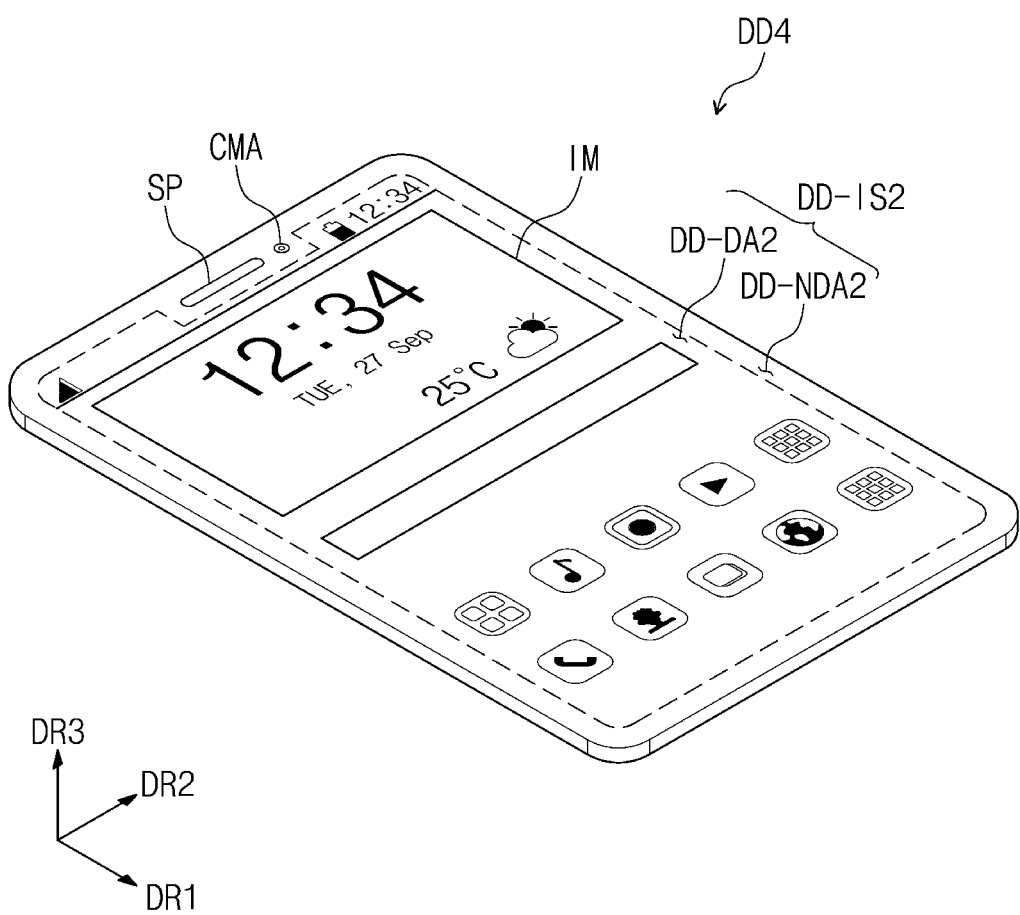
FIG. 1E is a perspective view illustrating a display device according to some exemplary embodiments.

FIG. 1C is a perspective view illustrating a display device according to some exemplary embodiments. FIG. 1D is a perspective view illustrating a display device according to some exemplary embodiments. FIG. 1E is a perspective view illustrating a display device according to some exemplary embodiments.

Referring to FIG. 1C, a display device DD2 may include a display area DD-DA2 having an amorphous shape. When compared with the display area DD-DA in FIG. 1A, the display area DD-DA2 of the display device DD2 may further include a display area DD-DA2 having at least one side protruding in the first direction DR1.

For example, the display device DD2 may include a speaker SP and a camera module CMA, each of which has a protruding shape and is disposed adjacent to the display area DD-DA2. The speaker SP and the camera module CMA overlap the bezel area DD-NDA2 and do not overlap the display area DD-DA2.

Referring to FIG. 1D, a display device DD3 may include first to third bending areas BA1, BA2, and BA3. When compared with the display device DD in FIG. 1A, two edge areas of a first non-bending areas NBA1, which face in the second direction DR2, are bent from a central area to define the second and third bending areas BA2 and BA3. The first bending area BA1 may correspond to the bending area BA in FIGS. 1A and 1B.

Referring to FIG. 1E, when compared with the display devices in FIGS. 1A to 1D, a display device DD4 may not include a bending area. That is, a display panel of the display device DD4 may be rigid, and the entire area thereof may be defined as a non-bending area.

Figure 2A:
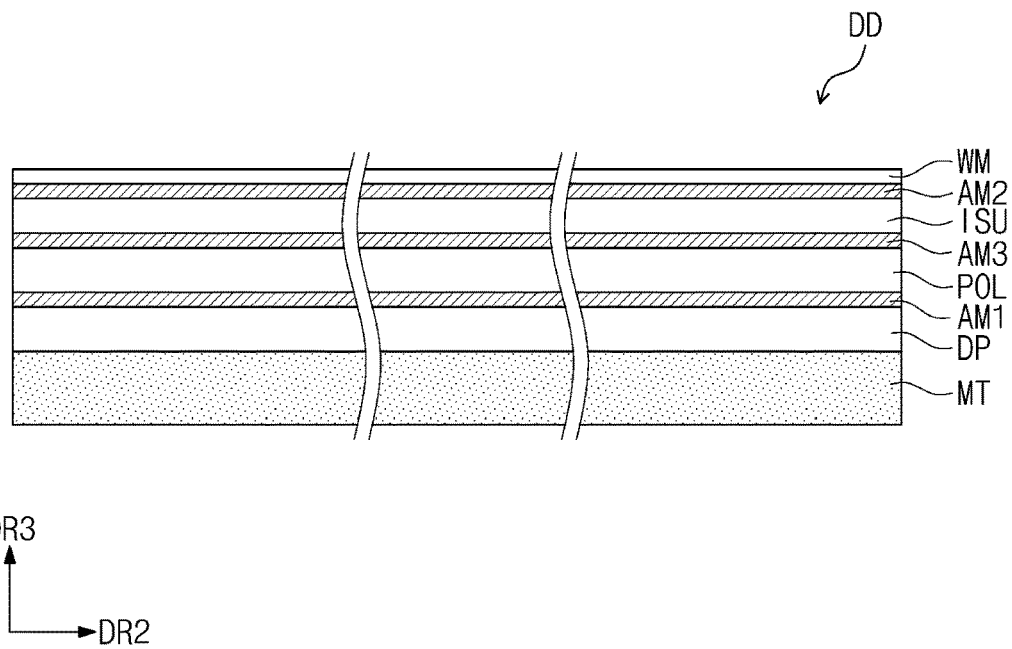
FIG. 2A is a cross-sectional view illustrating the display device of FIG. 1A according to some exemplary embodiments.
Figure 2B:
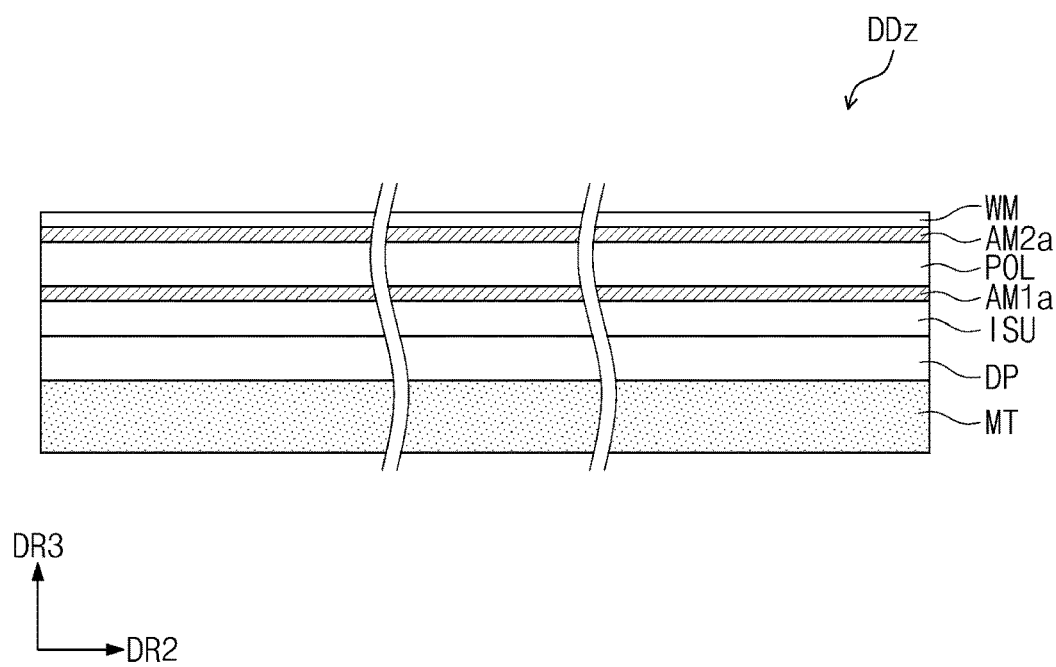
FIG. 2B is a cross-sectional view illustrating a display device according to some exemplary embodiments.

FIG. 2A is a cross-sectional view illustrating the display device of FIG. 1A according to some exemplary embodiments. FIG. 2B is a cross-sectional view illustrating a display device according to some exemplary embodiments.

Referring to FIG. 2A, the display device DD includes a reinforcing member MT, a display panel DP, a polarizing member POL, an input sensing unit ISU, a window member WM, and first to third adhesive members AM1 to AM3.

The window member WM may define the display surface DD-IS of the display device DD in FIG. 1A. That is, a top surface of the window member WM may correspond to the display surface DD-IS, and, on the top surface of the window member WM, a display area DD-DA from which an image IM is directly seen from the outside and a bezel area DD-NDA disposed adjacent to the display area DD-DA may be defined. In some exemplary embodiments, the bezel area DD-NDA may be omitted.

The display area DD-DA defined in the window member WM may correspond to a transmission area through which an image (e.g., image IM) provided from the display panel DP is substantially transmitted, and the bezel area DD-NDA may correspond to a non-transmission area through which the image provided from the display panel DP is not transmitted. Also, as previously described, the non-transmission area may be omitted from the window member WM.

The display panel DP is disposed between the reinforcing member MT and the polarizing member POL. The display panel DP may generate an image, and the generated image may be seen by an external user through the window member WM. The polarizing member POL may control polarization of external light that is incident through the window member WM.

The first adhesive member AM1 may be disposed between the polarizing member POL and the display panel DP, and the polarizing member POL and the display panel DP may be fixed to each other by the first adhesive member AM1. Although not shown, an adhesive member may be further provided between the display panel DP and the reinforcing member MT.

The input sensing unit ISU is disposed between the window member WM and the polarizing member POL. The input sensing unit ISU may detect an input applied from the outside. The input applied from the outside may be provided in various types. For example, the external input may include various types of external inputs, such as a portion of a user's body, a stylus pen, light, heat, pressure, etc. Also, the external input may further include an input, which is generated by contacting a portion of a human body, such as a hand of a user, and a space touch (e.g., hovering), which is generated by approached or being adjacent to the display device DD.

The second adhesive member AM2 may be disposed between the window member WM and the input sensing unit ISU, and the window member WM and the input sensing unit ISU may be fixed to each other by the second adhesive member AM2. The third adhesive member AM3 may be disposed between the polarizing member POL and the input sensing unit ISU, and the polarizing member POL and the input sensing unit ISU may be fixed to each other by the third adhesive member AM3.

The reinforcing member MT may support the display panel DP. The reinforcing member MT may contain a metallic material. For example, the metallic material may include molybdenum, silver, titanium, copper, or aluminum, or an alloy of at least one of these materials.

According to some exemplary embodiments, the first to third adhesive members AM1 to AM3 may be an optically clear adhesive film or an optically clear resin. Hereinafter, according to an exemplary embodiment, the first to third adhesive members AM1, AM2, and AM3 are described as optically clear adhesive films.

Referring to FIG. 2B, a display panel DP and an input sensing unit ISU of a display device DDz may be laminated with each other through a continuous process. That is, the input sensing unit ISU may be formed directly on the display panel DP through the continuous process. In this case, an adhesive member need not be disposed between the display panel DP and the input sensing unit ISU. Further, the third adhesive member AM3 in FIG. 2A may be omitted, and the polarizing member POL may be disposed between the input sensing unit ISU and the window member WM. A first adhesive member AM1a may be disposed between the input sensing unit ISU and the polarizing member POL, and a second adhesive member AM2a may be disposed between the window member WM and the polarizing member POL.

According to some exemplary embodiments, the input sensing unit ISU, the reinforcing member MT, and the window member WM may overlap with only the first non-bending area NBA1 in FIG. 1A. The display panel DP may overlap each of the first non-bending area NBA1, the second non-bending area NBA2, and the bending area BA that were described in association with FIG. 1A. That is, the first non-bending area NBA1, the second non-bending area NBA2, and the bending area BA may be defined by the display panel DP.

Figure 3:
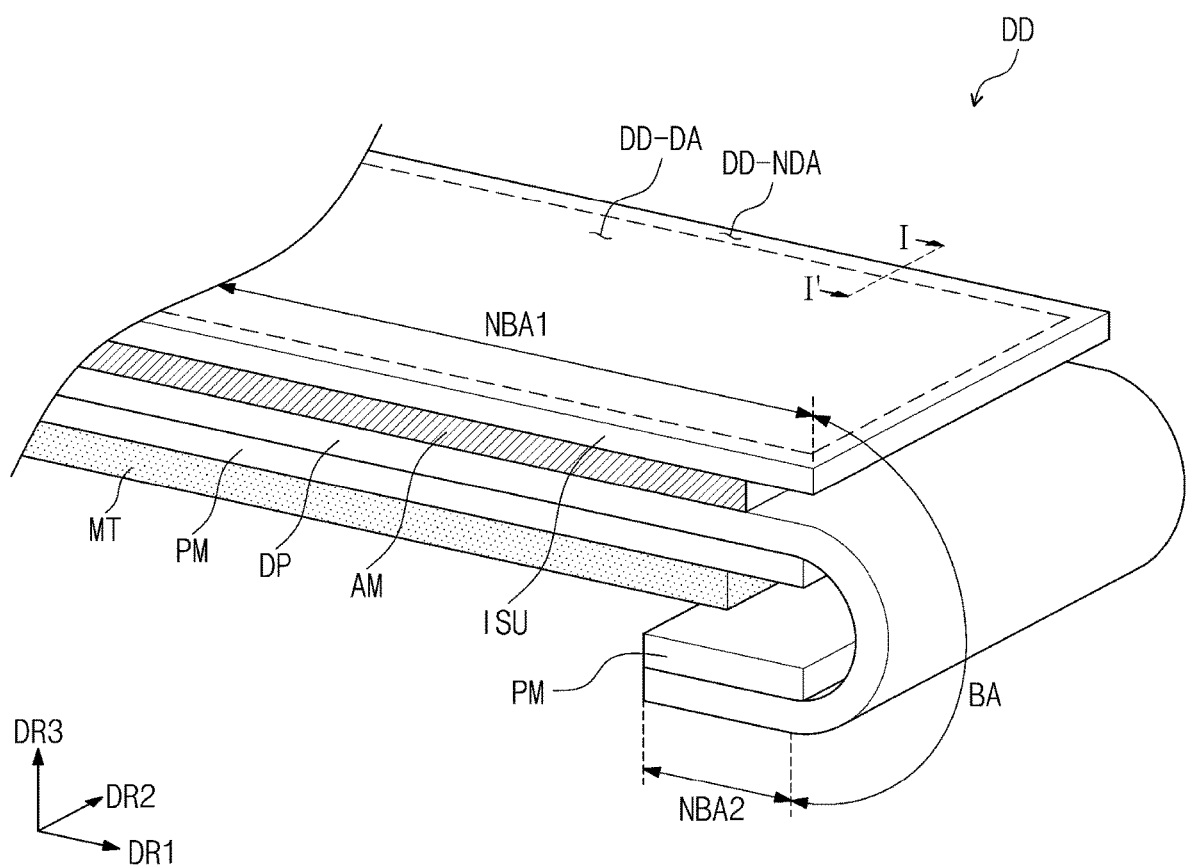
FIG. 3 is a perspective view illustrating a portion of the display device of FIG. 1 according to some exemplary embodiments.
Figure 4A:
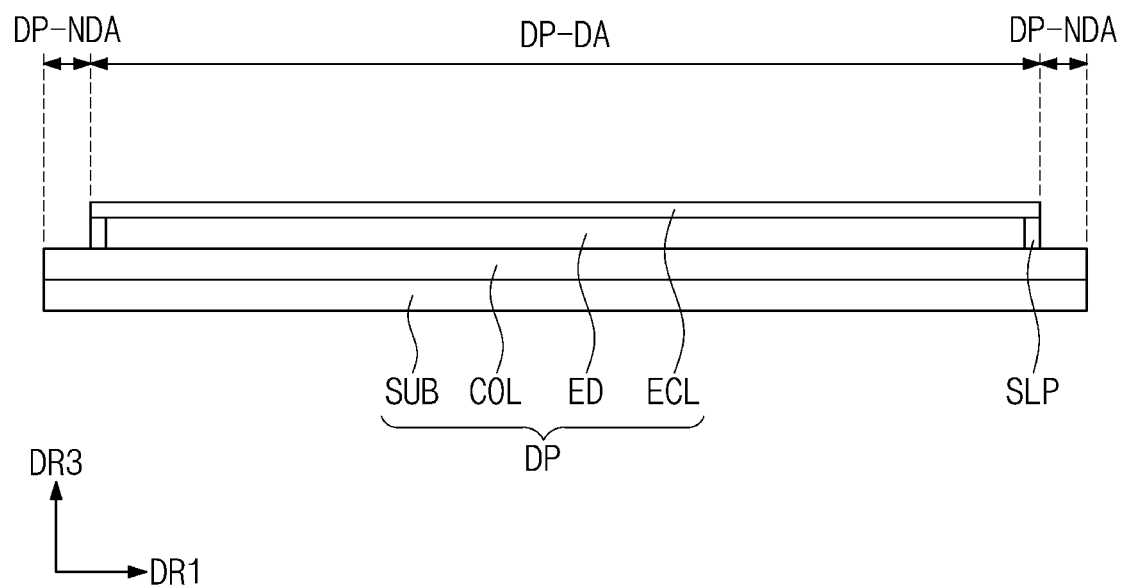
FIG. 4A is a cross-sectional view illustrating a display panel in FIG. 3 according to some exemplary embodiments.
Figure 4B:
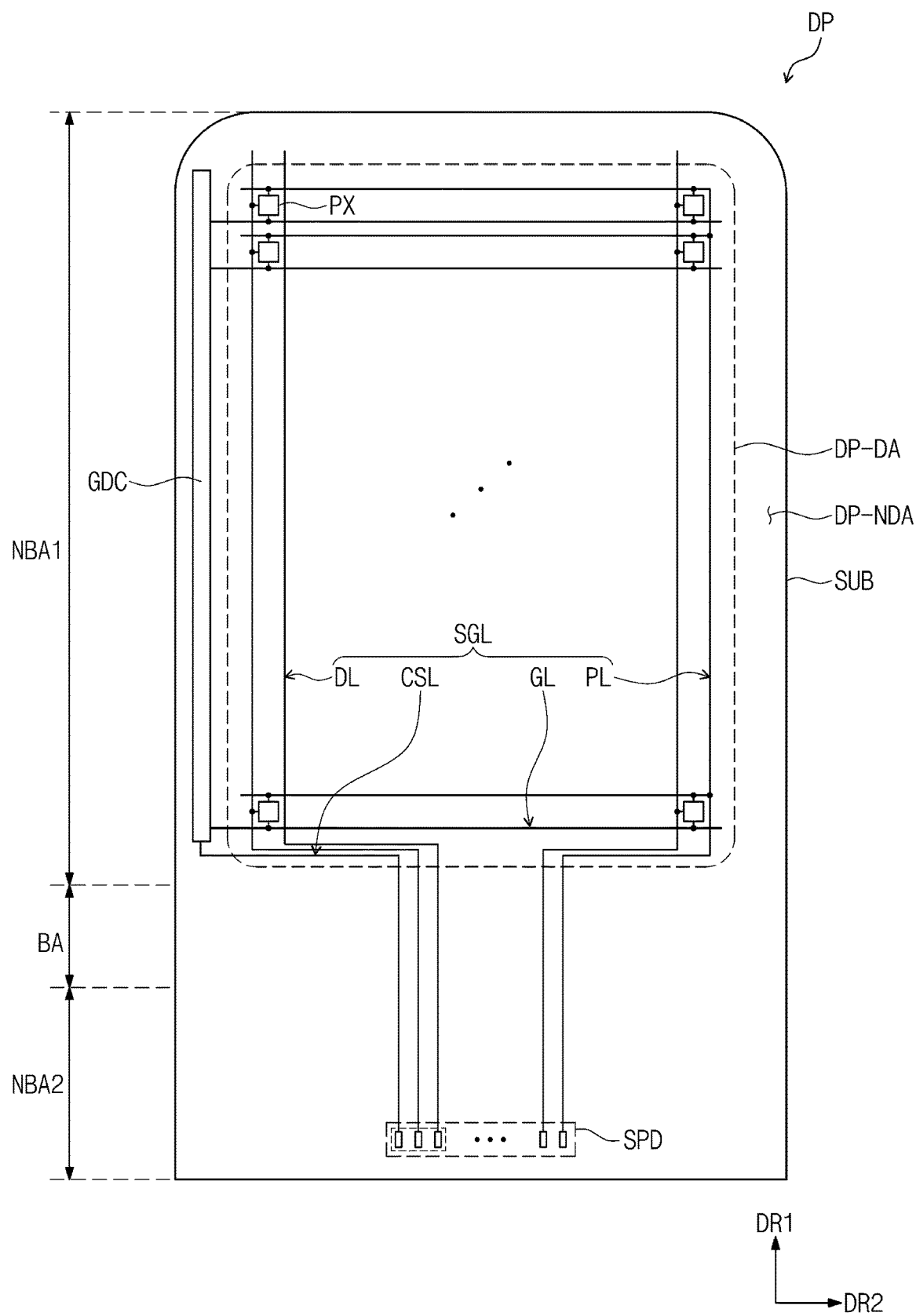
FIG. 4B is a plan view illustrating the display panel in FIG. 3 according to some exemplary embodiments.
Figure 4C:
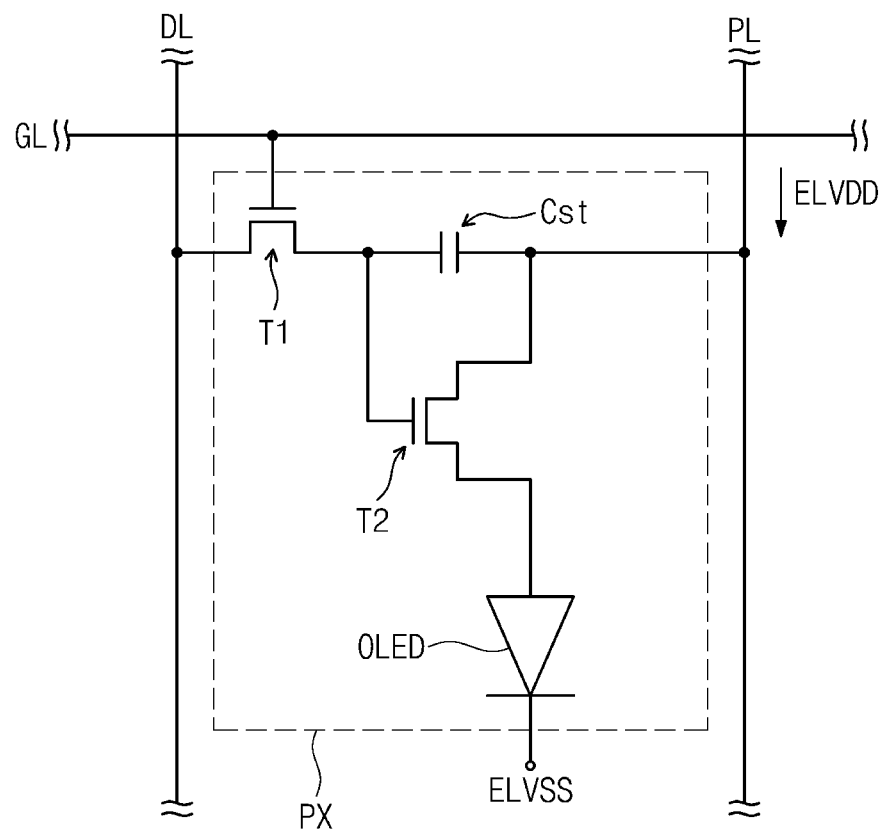
FIG. 4C is an equivalent circuit diagram illustrating a pixel in FIG. 4B according to some exemplary embodiments.

FIG. 3 is a perspective view illustrating a portion of the display device of FIG. 1 according to some exemplary embodiments. FIG. 4A is a cross-sectional view illustrating a display panel in FIG. 3 according to some exemplary embodiments. FIG. 4B is a plan view illustrating the display panel in FIG. 3 according to some exemplary embodiments. FIG. 4C is an equivalent circuit diagram illustrating a pixel in FIG. 4B according to some exemplary embodiments.

Referring to FIG. 3, among the components of the display device DD in FIG. 2A, the reinforcing member MT, the display panel DP, the adhesive member AM, and the input sensing unit ISU are illustrated. Also, the display device DD may further include a protection member PM, which is not illustrated in FIG. 2A. For convenience of description, a description of the window member WM, the polarizing member POL, and the adhesive members AM2 and AM3 will be omitted.

According to some exemplary embodiments, the display device DD may include a first non-bending area NBA1, a second non-bending area NBA2, and a bending area BA. The display area DD-DA may entirely overlap the first non-bending area NBA1 and partially overlap the second non-bending area NBA2. Hereinafter, the display device DD from which the boundary area of which a width in the second direction DR2, which is provided in the first non-bending area NBA1, gradually decreases is omitted, will be described according to some exemplary embodiments.

Referring to FIG. 4A, the display panel DP includes a substrate SUB, a circuit layer COL, a light emitting element layer ED, and an encapsulation member ECL.

The substrate SUB may include a plastic substrate, a glass substrate, or an organic/inorganic composite substrate. Also, the substrate SUB may be a laminated structure including a plurality of insulation layers. The plastic substrate may include at least one of an acrylic-based resin, a methacryl-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

The circuit layer COL may include a plurality of insulation layers, a plurality of conductive layers, and a semiconductor layer. The plurality of conductive layers of the circuit layer COL may constitute (or form) signal lines and a control circuit of a pixel.

The light emitting element layer ED includes a display element, e.g., an organic light emitting diode. However, exemplary embodiments are not limited thereto. For example, the light emitting element layer ED may include an inorganic light emitting diode or an organic-inorganic hybrid light emitting diode. According to some exemplary embodiments, the display elements may be disposed on the first non-bending area NBA1 of the display panel DP.

The encapsulation member ECL seals the light emitting element layer ED. For example, the encapsulation member ECL may be a rigid encapsulation substrate. The encapsulation member ECL protects the light emitting element layer ED from foreign substances, such as moisture, oxygen, and dust particles. The encapsulation member ECL may be coupled to the substrate SUB through a sealing member SLP. The sealing member SLP may include a frit. However, exemplary embodiments are not limited to the material forming the sealing member SLP.

As another example, the encapsulation member ECL may include at least one insulation layer. The encapsulation member ECL according to some exemplary embodiments may include at least one organic encapsulation layer and at least one inorganic encapsulation layer.

The first adhesive member AM1 described in FIG. 2A may be disposed on the encapsulation member ECL, and the input sensing unit ISU may be disposed on the first adhesive member AM1.

Referring to FIG. 4B, the display panel DP may include a driving circuit GDC, a plurality of signal lines SGL, a plurality of pads disposed on the pad area SPD (hereinafter, referred to as pads), and a plurality of pixels PX (hereinafter, referred to as pixels). The pixels PX are disposed on the display area DP-DA. Each of the pixels PX includes an organic light emitting diode and a pixel driving circuit connected thereto. The driving circuit GDC, the signal lines SGL, the pads disposed on the pad area SPD, and the pixel driving circuit may be provided in the circuit layer COL in FIG. 4A.

According to some exemplary embodiments, the pixels PX of the display panel DP and the driving circuit GDC of the circuit layer COL overlap the first non-bending area NBA1. The signal lines SGL may overlap each of the first non-bending area NBA1, the second non-bending area NBA2, and the bending area BA.

The driving circuit GDC generates a plurality of scan signals (hereinafter, referred to as scan signals) and outputs (e.g., sequentially outputs) the scan signals to a plurality of scan lines GL (hereinafter, referred to as scan lines). The driving circuit GDC may further output another control signal to the pixel driving circuit of the pixels PX.

The driving circuit GDC may include a plurality of thin-film transistors that are formed through the same process as that of the pixel driving circuit of the pixels PX, e.g., a low temperature polycrystalline silicon (LTPS) process or a low temperature polycrystalline oxide process.

The signal lines SGL overlap the display area DP-DA and the bezel area DP-NDA and are connected to the pads SPD. The signal lines SGL includes scan lines GL, data lines DL, a power line PL, and a control signal line CSL. The scan lines GL are connected to corresponding pixels PX of the pixels PX, respectively, and the data lines DL are connected to corresponding pixels PX of the pixels PX, respectively.

The power line PL is connected to the pixels PX. The control signal line CSL may provide control signals to the driving circuit GDC.

Also, although not shown, a driving chip for electrically connecting the signal lines SGL to the pads may be disposed on the substrate SUB and may overlap the bezel area DP-NDA. The driving chip transmits a driving signal to the data lines DL and the power line PL.

Referring to FIG. 4C, any one scan line GL, any one data line DL, a power line PL, and a pixel PX connected thereto are illustrated. However, exemplary embodiments are not limited to the configuration of the pixel PX in FIG. 4C. The configuration of the pixel PX may be varied.

An organic light emitting diode OLED may be a front light emitting type diode or a rear light emitting type diode. The pixel PX is a pixel driving circuit for driving the organic light emitting diode OLED and includes a first transistor T1 (or switching transistor), a second transistor T2 (or driving transistor), and a capacitor Cst. A first power voltage ELVDD is provided to the second transistor T2, and a second power voltage ELVSS is provided to the organic light emitting diode OLED. The second power voltage ELVSS may be less than the first power voltage ELVDD.

The first transistor T1 outputs a data signal applied to the data line DL in response to a scan signal applied to the scan line GL. The capacitor Cst charges a voltage corresponding to the data signal received from the first transistor T1. The second transistor T2 is connected to the organic light emitting diode OLED. The second transistor T2 controls a driving current flowing in the organic light emitting diode OLED in correspondence with an electric charge quantity stored in the capacitor Cst.

However, exemplary embodiments are not limited to the equivalent circuit shown in FIG. 4B. For example, the pixel PX may further include a plurality of transistors and include a larger number of capacitors. The organic light emitting diode OLED may be connected between the power line PL and the second transistor T2.

Also, the organic light emitting diode OLED provided in the pixel PX may be provided in the light emitting element layer ED in FIG. 4A, and the first and second transistors T1 and T2 may be provided in the circuit layer COL in FIG. 4A.

Each of the first transistor T1 and the second transistor T2 may be an N-type thin-film transistor or a P-type thin-film transistor. Also, in some exemplary embodiments, at least one of the first transistor T1 and the second transistor T2 may be an N-type thin-film transistor or a P-type thin-film transistor.

Referring to FIG. 3 again, the display device DD may further include a protection member PM disposed between the display panel DP and the reinforcing member MT. The protection member PM prevents external moisture from being introduced into the display panel DP and absorbs external impact. The protection member PM may be disposed on each of the first non-bending area NBA1 and the second non-bending area NBA2 of the display panel DP. For example, the protection member PM may include a first protection member and a second protection member, which are spaced apart from one another in the third direction DR3 and, in an unbent state of the display panel DP, the first direction DR1 with the bending area BA therebetween.

For example, the protection member PM may include a plastic film as a base layer. The protection member PM may include a plastic film containing one selected from the group consisting of polyethersulfone (PES), polyacrylate, polyetherimide (PEI), polyethylene napthalate (PEN), polyethylene terephthalate (PET), polyphenylene sulfide (PPS), polyallylate, polyimide (PI), polycarbonate (PC), and poly (arylene ether sulfone), or a combination of at least two of the aforementioned materials. It is noted, however, that exemplary embodiments are not limited to the material forming the protection member PM. For example, the protection member PM may contain an organic/inorganic composite material in addition to the plastic resin(s). The protection member PM may include a porous organic layer and inorganic material(s) filled in pores of the organic layer. The protection member PM may further include a functional layer formed on a plastic film. The functional layer may include a resin layer and may be formed through a coating method.

The reinforcing member MT may be disposed below the protection member PM while overlapping the first non-bending area NBA1. As previously described in association with FIG. 2A, the reinforcing member MT may be made of a metallic material to prevent the display panel DP from being damaged by external impact.

The adhesive member AM may attach the input sensing unit ISU and the display panel DP to each other. The adhesive member AM in FIG. 3 may correspond to the first adhesive member AM1 in FIG. 2A.

Figure 5A:
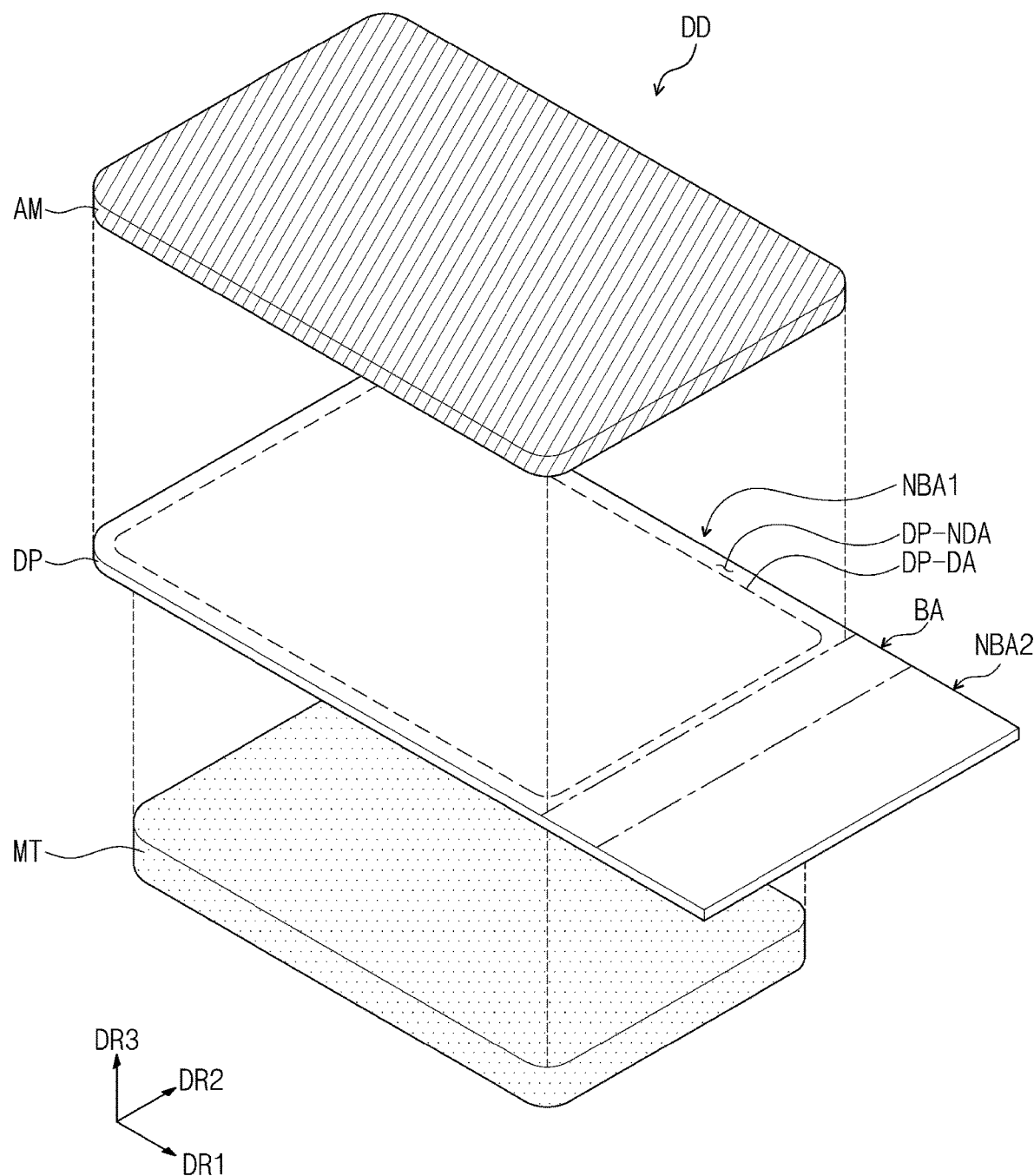
FIG. 5A is an exploded perspective view illustrating the display device in FIG. 3 according to some exemplary embodiments.
Figure 5B:
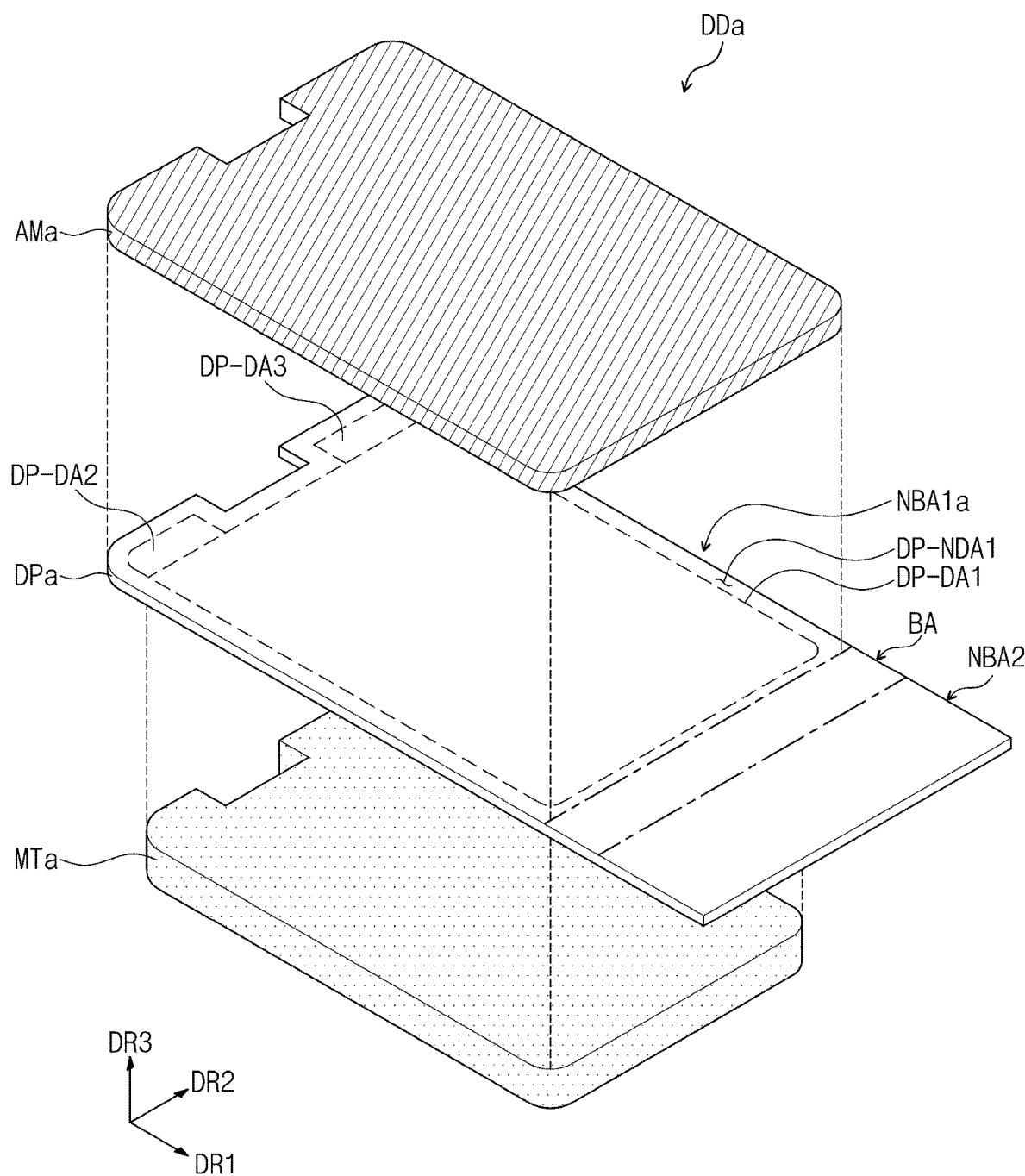
FIG. 5B is an exploded perspective view illustrating a display device according to some exemplary embodiments.

FIG. 5A is an exploded perspective view illustrating the display device in FIG. 3 according to some exemplary embodiments. FIG. 5B is an exploded perspective view illustrating a display device according to some exemplary embodiments.

Referring to FIG. 5A, the exploded perspective view of the adhesive member AM, the display panel DP, and the reinforcing member MT in FIG. 3 is illustrated, and the protection member PM and the input sensing unit ISU are omitted for convenience of description.

According to some exemplary embodiments, the adhesive member AM and the first non-bending area NBA1 of the display panel DP may entirely overlap with each other in the third direction DR3. On a plane, the adhesive member AM may have the same area as that of the first non-bending area NBA1 of the display panel DP. As illustrated in FIG. 5A, an edge portion of the adhesive member AM may be aligned with an edge portion of the first non-bending area NBA1 of the display panel DP.

In the third direction DR3, an entire area of the reinforcing member MT may overlap the first non-bending area NBA1 of the display panel DP. For instance, the reinforcing member MT may have an area less than that of each of the adhesive member AM and the first non-bending area NBA1 of the display panel DP. For example, the reinforcing member MT may have a width less than that of the display panel DP in each of the first direction DR1 and in the second direction DR2.

Although not shown, an adhesive agent may be attached on a top surface of the reinforcing member MT. The top surface of the reinforcing member MT, on which the adhesive agent is applied, may be disposed on a bottom portion of the display panel DP, and a determined external pressure may be applied to the reinforcing member MT in order to firmly fix the reinforcing member MT to the bottom portion of the display panel DP.

In this case, as the reinforcing member MT is made of a metallic material, the pressure applied to the reinforcing member MT may be transferred to one portion of the display panel DP. As a result, a circuit element of the circuit layer COL (refer to FIG. 4A) disposed on one portion of the display panel DP may be damaged by the pressure transferred to the display panel DP. In particular, a portion of the display panel DP that is adjacent to the edge portion of the reinforcing member MT may be applied with more pressure. To prevent (or at least reduce) this, the adhesive member AM, according to some exemplary embodiments, may be disposed on the display panel DP while overlapping with an entire area of the first non-bending area NBA1 of the display panel DP. Although the pressure applied to the reinforcing member MT is transferred to the display panel DP, the display panel DP may be prevented from moving because the display panel DP is entirely fixed by the adhesive member AM. Accordingly, the display panel DP may be prevented from being damaged by the pressure applied to the reinforcing member MT. This will be described later in more detail through FIGS. 6A and 6B.

In FIG. 5B, a display device DDa, which is based on the display device DD2 previously described in association with FIG. 1C, will be described. Referring to FIG. 5B, a display panel DPa may include first to third display areas DP-DA1, DP-DA2, and DP-DA3. The second display area DP-DA2 and the third display area DP-DA3 may protrude from the first display area DP-DA1 in the first direction DR1 and may be spaced apart from each other in the second direction DR2.

According to some exemplary embodiments, an adhesive member AMa may entirely overlap a first non-bending area NBA1a of the display panel DPa including the first to third display areas DP-DA1 to DP-DA3. On a plane, the adhesive member AMa may have the same area as that of the first non-bending area NBA1a of the display panel DPa.

An entire area of a reinforcing member MTa may overlap that of the first non-bending area NBA1a of the display panel DPa. On a plane, the reinforcing member MTa may have an area less than that of each of the adhesive member AMa and the first non-bending area NBA1a of the display panel DPa.

Figure 6A:
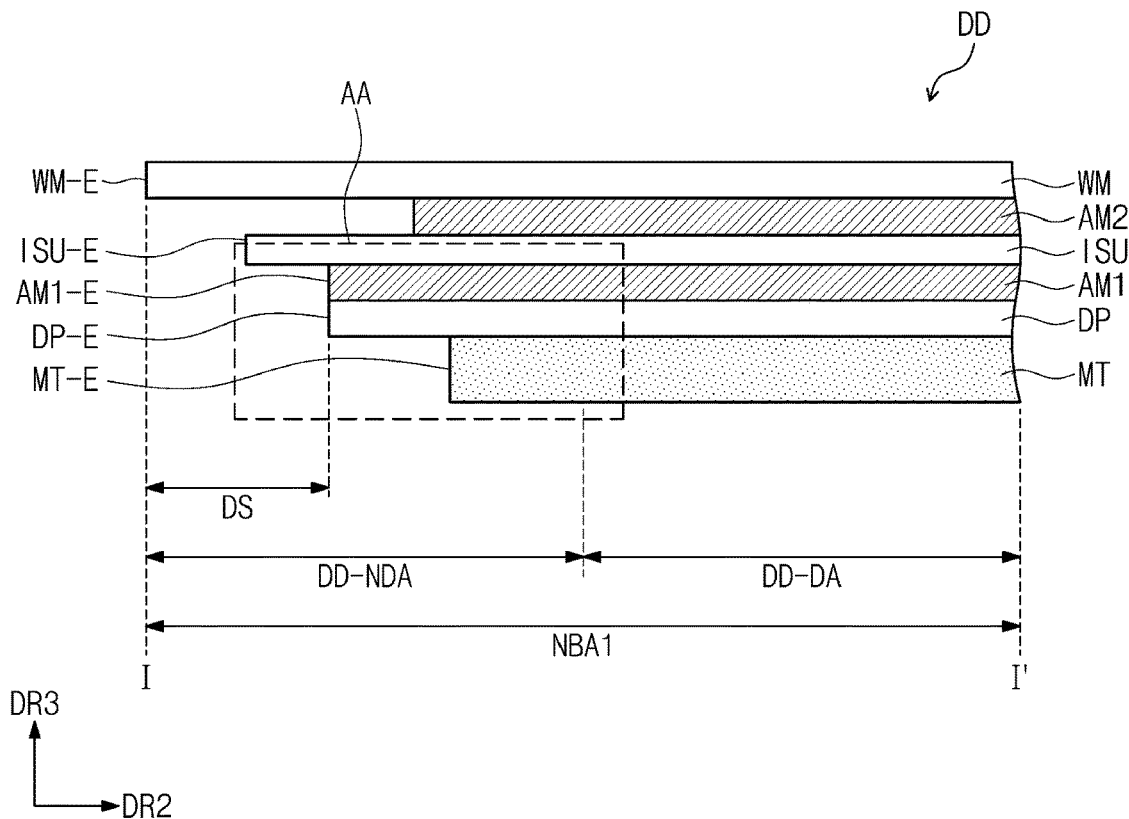
FIG. 6A is a cross-sectional view taken along sectional line I-I' of FIG. 3 according to some exemplary embodiments.
Figure 6B:
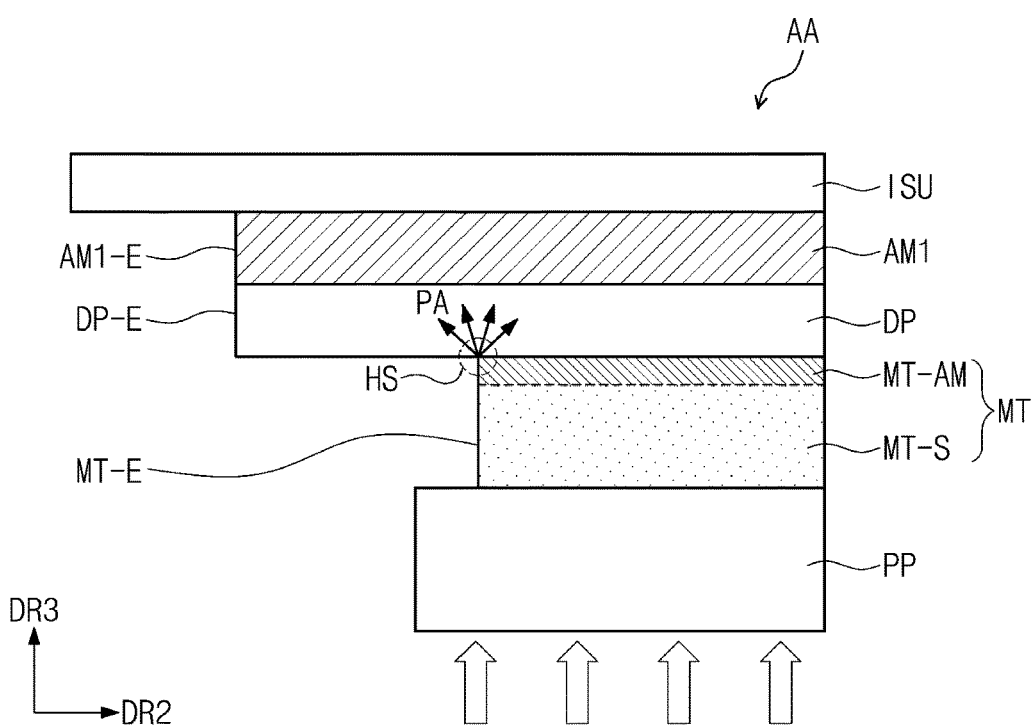
FIG. 6B is an enlarged cross-sectional view illustrating a region AA in FIG. 6A according to some exemplary embodiments.

FIG. 6A is a cross-sectional view taken along sectional line I-I' of FIG. 3 according to some exemplary embodiments. FIG. 6B is an enlarged cross-sectional view illustrating a region AA in FIG. 6A according to some exemplary embodiments.

FIGS. 6A and 6B are cross-sectional views illustrating the window member WM, the first adhesive member AM1, the second adhesive member AM2, the input sensing unit ISU, the display panel DP, and the reinforcing member MT. The protection member PM, the polarizing member POL, and the third adhesive member AM3 are omitted for convenience of description.

Hereinafter, in FIGS. 6A and 6B, an end (edge) of each of the window member WM, the first adhesive member AM1, the second adhesive member AM2, the input sensing unit ISU, the display panel DP, and the reinforcing member MT is illustrated. The end of each component may represent an outermost portion. Also, the first adhesive member AM1 and the display panel DP, which are described through FIGS. 6A and 6B, correspond to the adhesive member AM and the first non-bending area NBA1 in FIG. 5A, respectively.

According to some exemplary embodiments, the first adhesive member AM1 entirely overlaps the display panel DP. For example, an end AM1-E of the first adhesive member AM1 and an end DP-E of the display panel DP may be aligned with each other in the third direction DR3. For instance, according to some exemplary embodiments, on a plane of the window member WM, a first minimum distance DS between an end WM-E of the window member WM and an end DP-E of the display panel DP may be equal to a second minimum distance DS between the end WM-E of the window member WM and an end AM1-E of the first adhesive member AM1. As illustrated in FIG. 6A, each of the first minimum distance DS and the second minimum distance DS may be a length in the second direction DR2.

Also, on the plane of the window member WM, the first minimum distance DS may be less than a minimum distance between the end WM-E of the window member WM and an end MT-E of the reinforcing member MT. Accordingly, the end MT-E of the reinforcing member MT may overlap one portion of the display panel DP such that the end MT-E of the reinforcing member MT is spaced a predetermined distance from the end DP-E of the display panel DP in the second direction DR2.

Also, on the plane of the window member WM, the first minimum distance DS may be greater than a minimum distance from the end WM-E of the window member WM to an end ISU-E of the input sensing unit ISU. Accordingly, the end DP-E of the display panel DP may overlap one portion of the input sensing unit ISU such that the end DP-E of the display panel DP is spaced a predetermined distance from the end ISU-E of the input sensing unit ISU in the second direction DR2.

As described through FIG. 5A, the top surface of the reinforcing member MT, on which the adhesive agent is applied, may be disposed on a bottom portion of the display panel DP, and a predetermined external pressure may be applied to the reinforcing member MT in order to firmly fix the reinforcing member MT to the bottom portion of the display panel DP.

Referring to FIG. 6B, the reinforcing member MT includes a reinforcing part MT-S and an adhesive agent MT-AM disposed on the reinforcing part MT-S. For example, the adhesive agent MT-AM may be a pressure sensitive adhesive film. The reinforcing part MT-S may be made of a metallic material.

A pad part PP may be disposed on an entire area of a bottom surface of the reinforcing part MT-S to compress the reinforcing part MT-S toward the display panel DP. When the pad part PP applies a pressure to the reinforcing part MT-S, a pressure PA may be transferred to the display panel DP through the reinforcing part MT-S. The pressure PA may be applied more to one portion HS of the display panel DP that is adjacent to the end MT-E of the reinforcing member MT.

As illustrated in FIG. 6B, the pressure PA transferred from the reinforcing part MT-S may be further concentrated on the one portion HS of the display panel DP that is adjacent to the end MT-E of the reinforcing member MT. As a result, as the one portion HS of the display panel DP moves or is delaminated, a circuit element provided in (or on) the one portion HS of the display panel DP may be damaged.

However, according to some exemplary embodiments, as the first adhesive member AM1 is disposed on an entire area of a top surface of the display panel DP, the display panel DP may be prevented from moving even when the pressure PA transferred from the reinforcing part MT-S is applied. That is, as the display panel DP is fixed by the first adhesive member AM1, the one portion HS of the display panel DP may be prevented from moving or being delaminated by the pressure PA applied from the end MT-E of the reinforcing member MT. Accordingly, sine the display panel DP may be prevented from being damaged, overall reliability of the display device DD may be enhanced.

Figure 7:
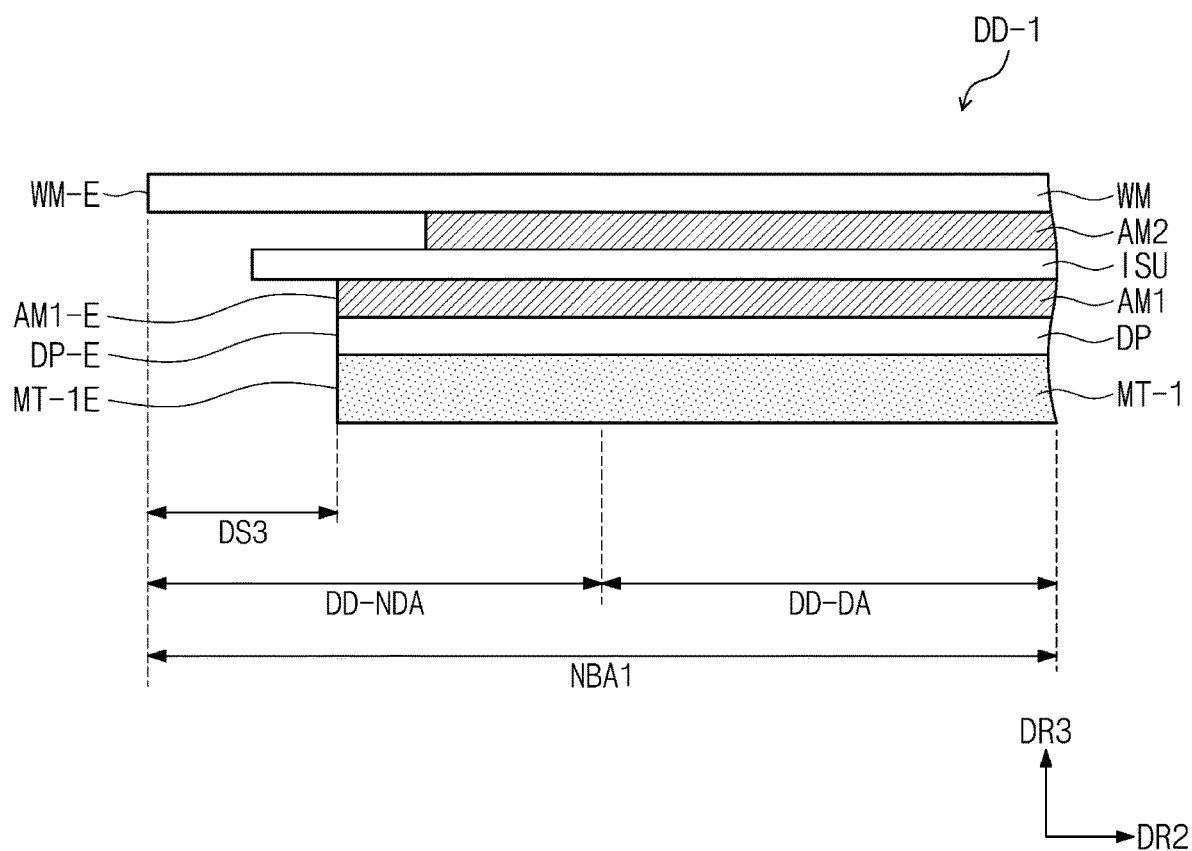
FIG. 7 is a cross-sectional view illustrating a display device according to some exemplary embodiments.

FIG. 7 is a cross-sectional view illustrating a display device according to some exemplary embodiments.

When a display device DD-1 in FIG. 7 is compared with the display device DD in FIG. 6A, only a structure of a reinforcing member MT-1 is varied, and other components have substantially the same structure and constitution as described in association with FIG. 6A. As such, a description for the other components will be omitted, and FIG. 7 will be mainly described regarding the reinforcing member MT-1.

Referring to FIG. 7, when compared with the reinforcing member MT in FIGS. 5A and 6A, the reinforcing member MT-1 entirely overlaps with each of a first adhesive member AM1 and a first non-bending area NBA1 of a display panel DP. For example, an end MT1-E of the reinforcing member MT-1, an end AM1-E of the first adhesive member AM1, and an end DP-E of the display panel DP may be aligned with each other in the third direction DR3. As such, on a plane of a window member WM, a minimum distance DS3 from an end WM-E of the window member WM to the end MT1-E of the reinforcing member MT-1 may be equal to a minimum distance DS3 from the end WM-E of the window member WM to the end DP-E of the display panel DP or from the end WM-E of the window member WM to the end AM1-E of the first adhesive member AM1.

As previously described through FIG. 6B, but in association with FIG. 7, as a pad part PP may be disposed on an entire area of a bottom surface of the reinforcing member MT-1, the reinforcing member MT-1 may be compressed toward the display panel DP. As such, a pressure PA may be applied more to one portion HS of the display panel DP, which is adjacent to the end MT-1E of the reinforcing member MT. However, the end MT-1E of the reinforcing member MT-1, according to as described in association with FIG. 7, is aligned with the end DP-E of the display panel DP. As a result, the pressure PA may be applied more to the one portion HS of the display panel DP that is adjacent to the end MT-1E of the reinforcing member MT. In this manner, as the area of the display panel DP that is adjacent to the end MT1-E of the reinforcing member MT-1 in FIG. 7 decreases, the pressure PA applied to the display panel DP may decrease.

However, exemplary embodiments are not limited to the aforementioned configurations. For example, the end MT-1E of the reinforcing member MT-1 may be adjacent to the end WM-E of the window member MW more than being adjacent to the end DP-E of the display panel DP on a plane. That is, on the plane of the window member WM, a minimum distance from the end WM-E of the window member WM to the end MT-1E of the reinforcing member MT-1 may be equal to or less than a minimum distance from the end WM-E of the window member WM to the end DP-E of the display panel DP.

Figure 8:
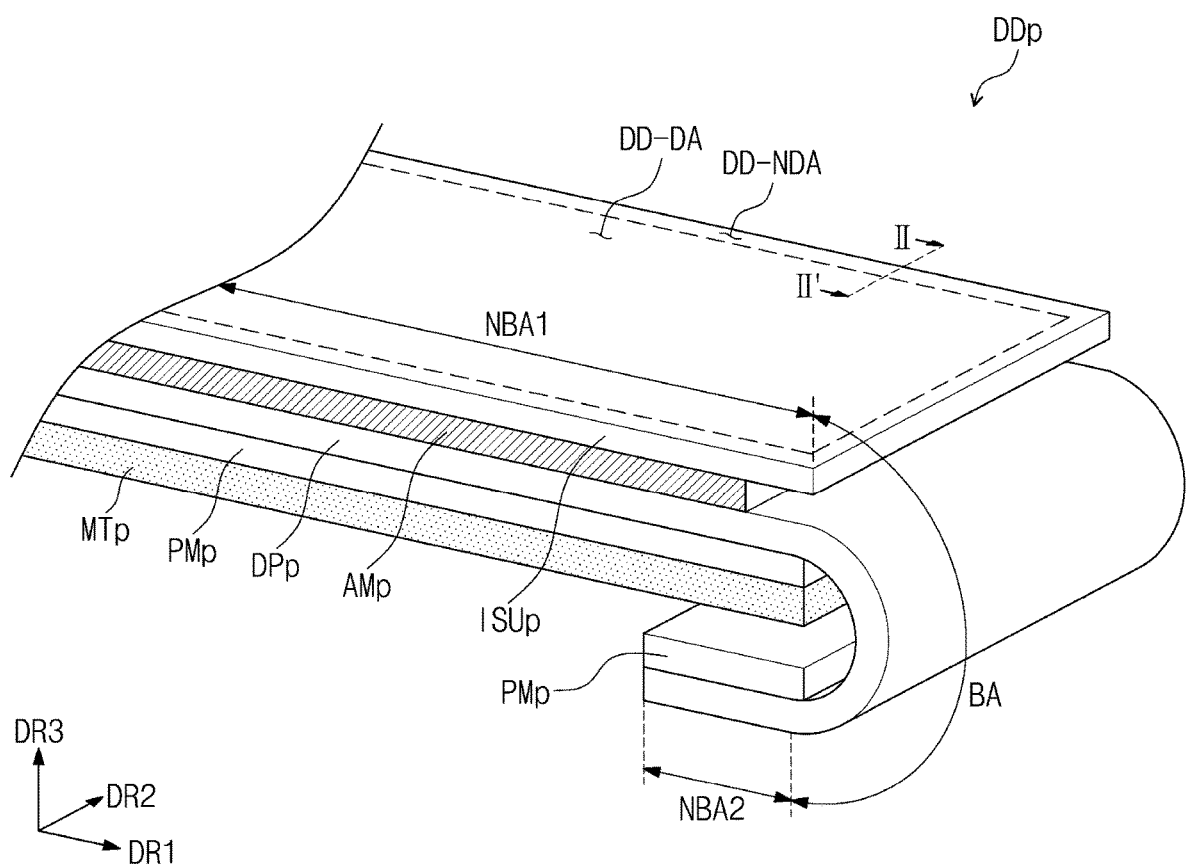
FIG. 8 is a perspective view illustrating a portion of a display device according to some exemplary embodiments.
Figure 9A:
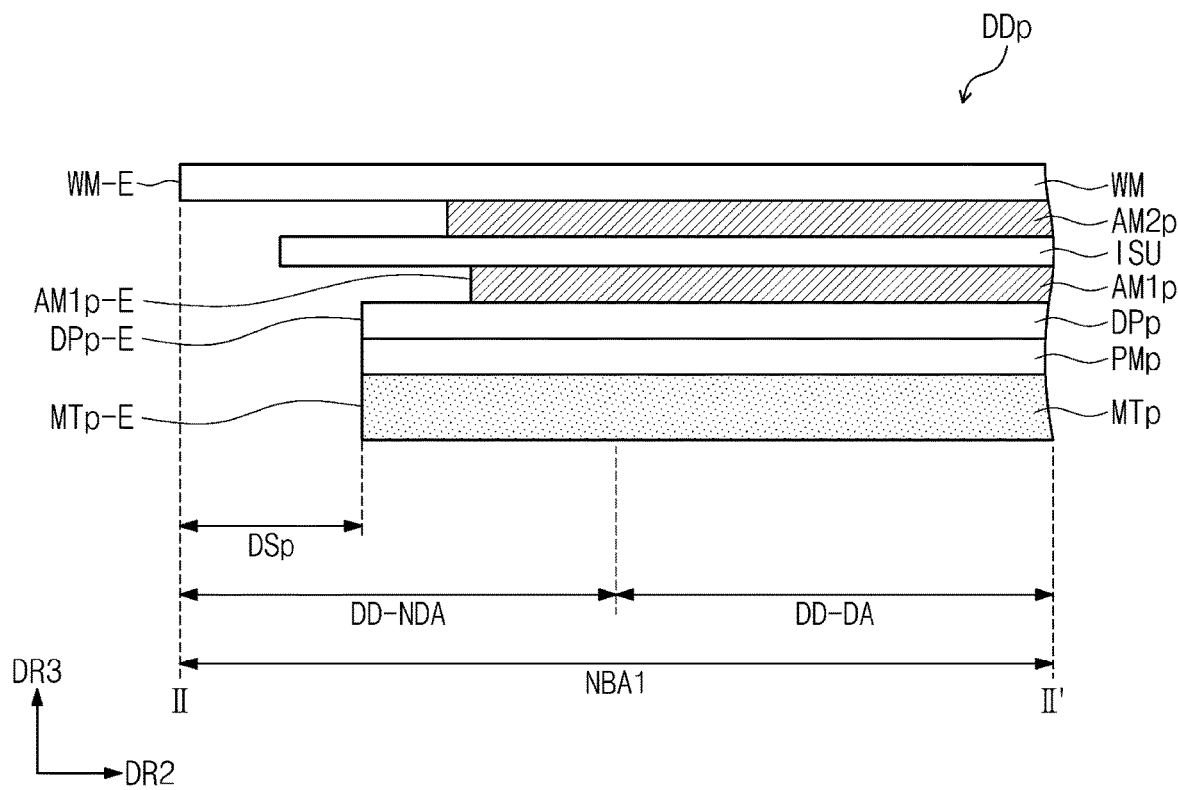
FIGS. 9A and 9B are cross-sectional views taken along sectional line in FIG. 8 according to various exemplary embodiments.
Figure 9B:
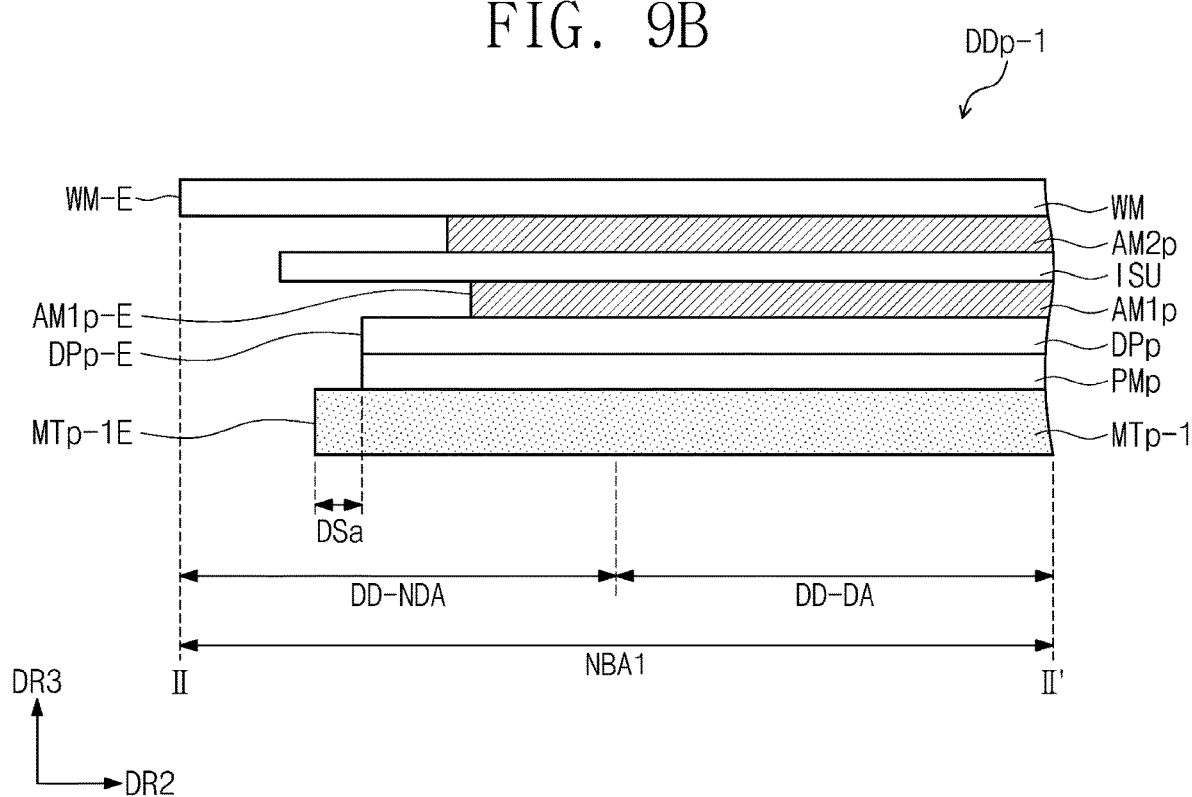

FIG. 8 is a perspective view illustrating a portion of a display device according to some exemplary embodiments. FIGS. 9A and 9B are cross-sectional views taken along sectional line II-II' in FIG. 8 according to various exemplary embodiments.

Referring to FIG. 8, a display device DDp includes an input sensing unit ISUp, an adhesive member AMp, a display panel DPp, a protection member PMp, and a reinforcing member MTp. When the display device DDp in FIG. 8 is compared with the display device DD in FIG. 3, the adhesive member AMp and the reinforcing member MTp are different, and other components have substantially the same structures and constitutions as previously described. As such, description regarding the other components will be omitted for convenience of description.

Referring to FIGS. 8 and 9A, when compared with the adhesive member AM in FIGS. 5A and 6A, the adhesive member AMp may have a width less than that of the display panel DPp in each of the first direction DR1 and the second direction DR2. In this case, on a plane of the window member WM, a minimum distance DSp from an end WM-E of the window member WM to an end DPp-E of the display panel DPp may be less than a minimum distance from the end WM-E of the window member WM to an end AM1p-E of the first adhesive member AM1p.

According to some exemplary embodiments, an end MTp-E of the reinforcing member MTp and an end DPp-E of the display panel DPp may be aligned with each other in the third direction DR3. For example, on a plane of the window member WM, a minimum distance DSp from the end WM-E of the window member WM to the end MTp-E of the reinforcing member MTp may be equal a minimum distance DSp from the end WM-E of the window member WM to the end DPp-E of the display panel DPp.

In a process of attaching the reinforcing member MTp to a bottom portion of the display panel DPp, a pressure may be transferred to the reinforcing member MTp by a pad part PP, which is described through FIG. 6B, and an intensity of a pressure applied to the end MTp-E of the reinforcing member MTp may increase.

According to exemplary embodiment(s) described in association with FIG. 9A, as the end MTp-E of the reinforcing member MTp is aligned with the end DPp-E of the display panel DPp in the third direction DR3, the display panel DPp may be prevented from being damaged by an external pressure. As such, the intensity of the pressure applied from the end MTp-E of the reinforcing member MTp to the display panel DPp may be distributed to the end DPp-E of the display panel DPp and the outside adjacent thereto. As a result, the intensity of the pressure applied to the display panel DPp by the end MTp-E of the reinforcing member MTp may overall decrease.

When a display device DDp-1 in FIG. 9B is compared with the display device DDp in FIG. 9A, only a reinforcing member MTp-1 is different, and other components have substantially the same structures and constitutions as previously described. As such, description regarding the other components will be omitted for convenience of description.

According to some exemplary embodiments, in the second direction DR2, a minimum distance from an end WM-E of a window member WM to an end MTp-1E of the reinforcing member MTp-1 may be less than a minimum distance from the end WM-E of the window member WM to an end DPp-E of a display panel DPp. That is, on a plane of the window member WM, the reinforcing member MTp-1 may have an area greater than that of a first non-bending area NBA1 of the display panel DPp. As illustrated in FIG. 9B, in the second direction DR2, the end MTp-1E of the reinforcing member MTp-1 may extend a predetermined distance DSa further than the end DPp-E of the display panel DPp.

As described above, the end MTp-1E of the reinforcing member MTp-1 may be more adjacent to the end WM-E of the window member WM than the end DPp-E of the display panel DPp. That is, the end MTp-1E of the reinforcing member MTp-1 may not overlap the display panel DPp. Thus, a pressure caused by the end MTp-1E of the reinforcing member MTp-1 may be prevented from being transferred to the display panel DPp.

Figure 10:
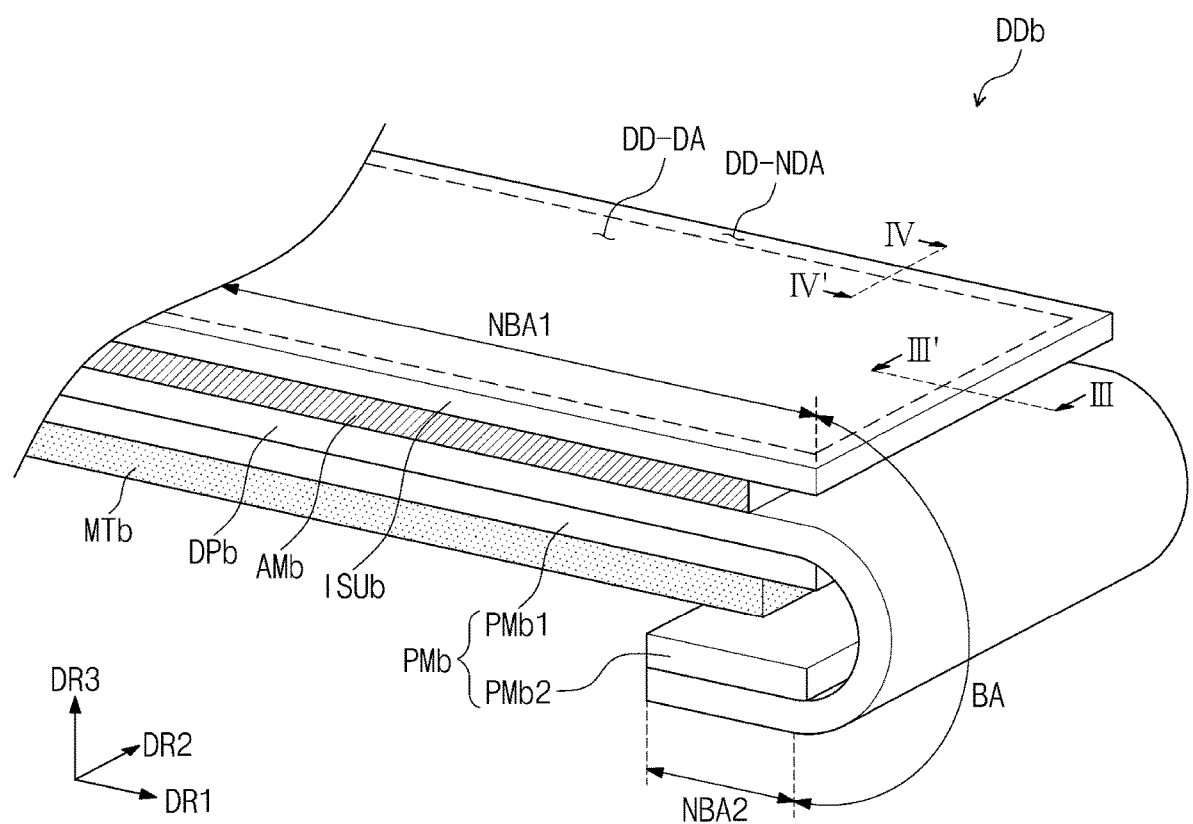
FIG. 10 is a perspective view illustrating a portion of a display device according to some exemplary embodiments.
Figure 11:
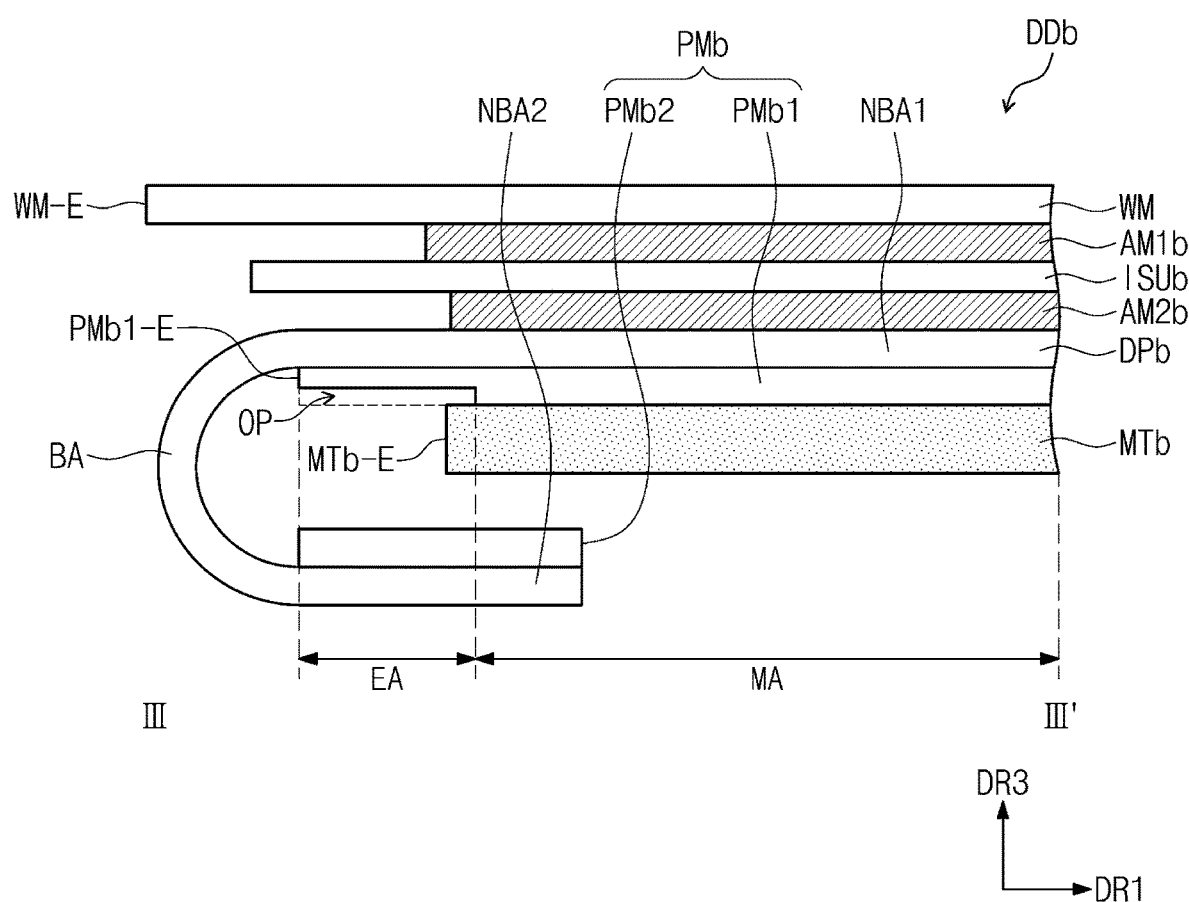
FIG. 11 is a cross-sectional view taken along sectional line of FIG. 10 according to some exemplary embodiments.
Figure 12:
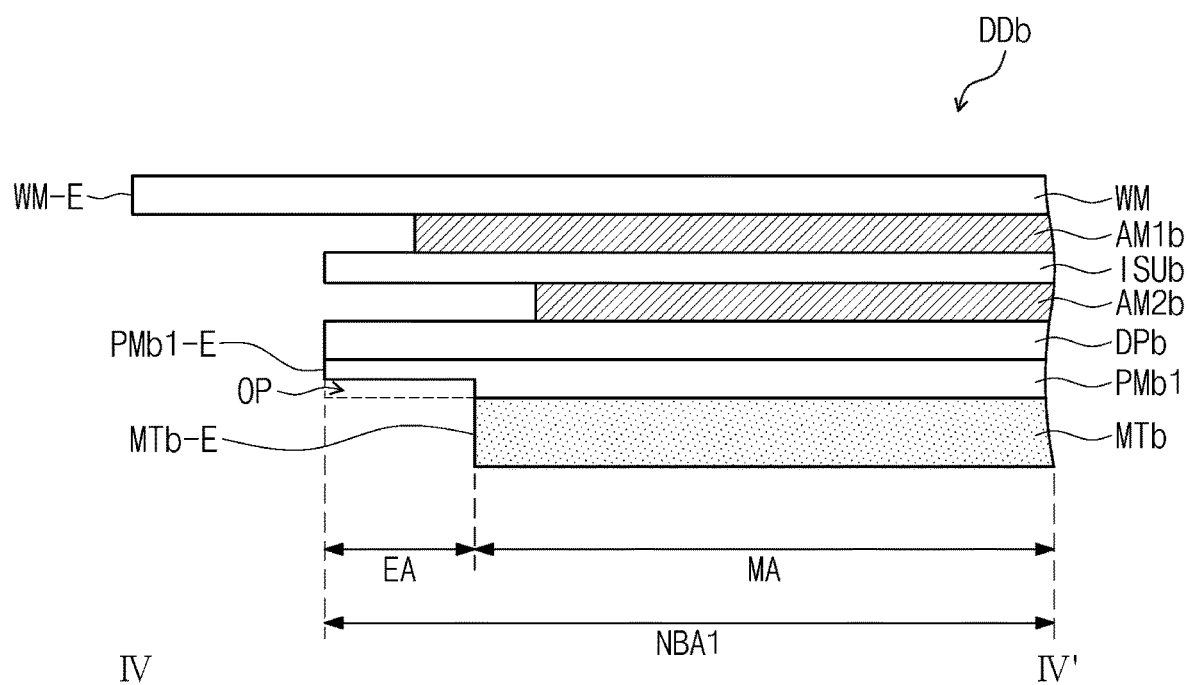
FIG. 12 is a cross-sectional view taken along sectional line IV-IV' of FIG. 10 according to some exemplary embodiments.

FIG. 10 is a perspective view illustrating a portion of a display device according to some exemplary embodiments. FIG. 11 is a cross-sectional view taken along sectional line III-III' of FIG. 10 according to some exemplary embodiments. FIG. 12 is a cross-sectional view taken along sectional line IV-IV' of FIG. 10 according to some exemplary embodiments.

Referring to FIG. 10, a display device DDb includes an input sensing unit ISUb, an adhesive member AMb, a display panel DPb, a protection member PMb, and a reinforcing member MTb. When the display device DDb in FIG. 10 is compared with the display device DDp in FIG. 8, only a protection member PMb and a reinforcing member MTb are different, and other components may have substantially the same structures and constitutions as previously described. As such, description regarding the other components will be omitted.

Referring to FIGS. 10 and 11, a display panel DPb includes a first non-bending area NBA1, a second non-bending area NBA2, and a bending area BA connecting the first non-bending area NBA1 to the second non-bending area NBA2. The first non-bending area NBA1 may entirely overlap the display area DD-DA (refer to FIG. 3), and the second non-bending area NBA2 may partially overlap the display area DD-DA (refer to FIG. 3).

The protection member PMb includes a first protection member PMb-1 disposed on the first non-bending area NBA1 of the display panel DPb and a second protection member PMb-2 disposed on the second non-bending area NBA2.

According to some exemplary embodiments, an end PMb 1-E of the first protection member PMb-1 may be more adjacent to an end WM-E of the window member WM than an end MTb-E of the reinforcing member MTb. The first protection member PMb-1 may include a main area MA and an edge area EA surrounding the main area MA. The main area MA of the first protection member PMb-1 may entirely overlap the reinforcing member MTb, and the edge area EA of the first protection member PMb-1 may partially overlap the reinforcing member MTb.

The edge area EA of the first protection member PMb-1, according to some exemplary embodiments, may have a shape recessed from a bottom surface of the first protection member PMb-1 toward a top surface of the first protection member PMb-1. As such, an opening OP may be defined in the edge area EA of the first protection member PMb-1. Hereinafter, the edge area EA of the first protection member PMb-1 will be described as an area including the opening OP.

Also, in the third direction DR3, which is a thickness direction of the window member WM, the edge area EA of the first protection member PMb-1 may have a thickness less than that of the main area MA of the first protection member PMb-1. The second protection member PMb-2 may have the same thickness as that of the main area MA of the first protection member PMb-1.

In a process of attaching the reinforcing member MTb to a bottom portion of the display panel DPb, a pressure may be transferred to the reinforcing member MTb by the pad part PP in FIG. 6B. According to some exemplary embodiments, the end MTb-E of the reinforcing member MTb may overlap the edge area EA of the first protection member PMb-1. In this case, an intensity of a pressure transferred to the end MTb-E of the reinforcing member MTb may be transferred to the edge area EA of the first protection member PMb-1. However, the intensity of the pressure transferred to the end MTb-E of the reinforcing member MTb may be distributed by the opening OP, and thus, not be transferred to the display panel DPb. Accordingly, damage generated on the display panel DPb in the process of attaching the reinforcing member MTb to the bottom portion of the display panel DPb may be prevented.

Referring to FIG. 12, the edge area EA of the first protection member PMb-1 may not overlap the reinforcing member MTb. The main area MA of the first protection member PMb-1 may entirely overlap the reinforcing member MTb. As the intensity of the pressure transferred to the end MTb-E of the reinforcing member MTb is transferred to one portion of the opening OP of the edge area EA of the first protection member PMb-1, the intensity of the pressure transferred to the end MTb-E of the reinforcing member MTb may be distributed.

According to various exemplary embodiments, an adhesive member may be disposed on a top surface of a display panel while entirely overlapping the same. Accordingly, the display panel may be fixed by the adhesive member even when pressure generated while a reinforcing member is attached to a bottom portion of the display panel is applied. As a result, the display panel may be prevented from being damaged.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device comprising:
    a window member;
    a display panel disposed below the window member;
    an input sensing unit disposed between the window member and the display panel;
    a first adhesive member disposed between the input sensing unit and the display panel, the first adhesive member overlapping the display panel and being spaced apart from the window member;
    a second adhesive member disposed between the window member and the input sensing unit; and
    a reinforcing member disposed below the display panel such that the display panel is disposed between the window member and the reinforcing member,
    wherein, on a plane of the window member, a first minimum distance from an outermost portion of the window member to an outermost portion of the display panel is equal to a second minimum distance from the outermost portion of the window member to an outermost portion of the first adhesive member,
    wherein, on the plane of the window member, a third minimum distance from the outermost portion of the window member to an outermost portion of the second adhesive member is greater than the first minimum distance, and
    wherein, on the plane of the window member, a fourth minimum distance from the outermost portion of the window member to an outermost portion of the input sensing device is less than a fifth minimum distance from the outermost portion of the window member to an outermost portion of the reinforcing member.

2. The display device of claim 1, wherein, on the plane of the window member, the first minimum distance is less than the fifth minimum distance from the outermost portion of the window member to the outermost portion of the reinforcing member.

3. The display device of claim 1, wherein the display panel comprises:
    a first non-bending area disposed above the reinforcing member and entirely overlapping the first adhesive member;
    a second non-bending area disposed below the reinforcing member; and
    a bending area connecting the first non-bending area to the second non-bending area.

4. The display device of claim 3, wherein, on the plane of the window member, the first minimum distance is a distance from the outermost portion of the window member to an outermost portion of the first non-bending area.

5. The display device of claim 3, wherein an entire area of the first adhesive member entirely overlaps the first non-bending area and partially overlaps the second non-bending area.

6. The display device of claim 3, wherein a plurality of display elements is disposed on the first non-bending area.

7. The display device of claim 3, further comprising:
    a protection member disposed between the display panel and the reinforcing member,
    wherein the protection member comprises:
        a first protection member disposed on the first non-bending area; and
        a second protection member disposed on the second non-bending area, and
    wherein an entire area of the reinforcing member entirely overlaps the first protection member.

8. The display device of claim 1, wherein the fourth minimum distance from the outermost portion of the window member to the outermost portion of the input sensing unit is less than the first minimum distance.

9. The display device of claim 1, wherein, on the plane of the window member, the fifth minimum distance from the outermost portion of the window member to the outermost portion of the reinforcing member is equal to or greater than the first minimum distance.

10. The display device of claim 1, wherein the reinforcing member comprises a metallic material.

11. A display device comprising:
    a window member;
    a display panel disposed below the window member, the display panel being bent about an axis extending in a first direction;
    an input sensing unit disposed between the window member and the display panel;
    a first adhesive member disposed between the window member and the display panel;
    a second adhesive member disposed between the window member and the input sensing unit; and
    a reinforcing member disposed below the display panel such that the display panel is disposed between the window member and the reinforcing member,
    wherein, on a plane of the window member, a first minimum distance from an outermost portion of the window member to an outermost portion of the display panel is equal to or greater than a second minimum distance from the outermost portion of the window member to an outermost portion of the reinforcing member,
    wherein, on the plane of the window member, the outermost portion of the window member extends farther outward than the outermost portion of the display panel and an outermost portion of the input sensing unit, and
    wherein, on the plane of the window member, a third minimum distance from the outermost portion of the window member to the outermost portion of the input sensing unit is less than a fourth minimum distance from the outermost portion of the window member to the outermost portion of the reinforcing member.

12. The display device of claim 11, wherein:
    on the plane of the window member, the first minimum distance is less than a minimum distance from the outermost portion of the window member to an outermost portion of the first adhesive member; and the outermost portion of the window member, the outermost portion of the display panel, and the outermost portion of the reinforcing member longitudinally extend along a second direction crossing the first direction.

13. The display device of claim 12, wherein the display panel comprises:
a first non-bending area disposed above the reinforcing member and entirely overlapping the reinforcing member;
a second non-bending area disposed below the reinforcing member and partially overlapping the reinforcing member; and
a bending area connecting the first non-bending area to the second non-bending area.

14. The display device of claim 13, wherein, on the plane of the window member, the reinforcing member has an area greater than that of the first non-bending area.

15. The display device of claim 13, further comprising:
a first protection member disposed between the first non-bending area and the reinforcing member; and
a second protection member disposed on the second non-bending area.

16. A display device comprising:
a window member;
a display panel disposed below the window member;
an adhesive member disposed between the window member and the display panel;
a protection member disposed below the display panel such that the display panel is disposed between the window member and the protection member, the protection member comprising a top surface, a bottom surface, and a side surface connecting the top surface to the bottom surface; and
a reinforcing member disposed on the bottom surface of the protection member,
wherein:
the bottom surface of the protection member comprises an edge area recessed toward the top surface of the protection member;
the protection member comprises a main area surrounded by the edge area; and
an outermost portion of the reinforcing member overlaps the edge area.

17. The display device of claim 16, wherein, in a thickness direction of the window member, a thickness of the edge area is smaller than a thickness of the main area.

18. The display device of claim 16, wherein the display panel comprises:
a first non-bending area disposed on the top surface of the protection member;
a second non-bending area disposed below the reinforcing member; and
a bending area connecting the first non-bending area to the second non-bending area.

19. The display device of claim 18, wherein:
the protection member comprises a first protection member disposed on the first non-bending area and a second protection member disposed on the second non-bending area; and
a thickness of the second protection member is equal to a thickness of the main area of the first protection member.

20. The display device of claim 16, wherein, on a plane of the window member, a minimum distance from an outermost portion of the window member to an outermost portion of the protection member is less than a minimum distance from the outermost portion of the window member to the outermost portion of the reinforcing member.

* * * * *